United States Patent
Hayton

(10) Patent No.: US 8,464,241 B2
(45) Date of Patent: Jun. 11, 2013

(54) METHODS AND SYSTEMS FOR PATCHING MULTIPLE DISK IMAGES DERIVED FROM A COMMON BASE DISK IMAGE

(75) Inventor: Richard Hayton, Cambridge (GB)

(73) Assignee: Citrix Systems, Inc., Fort Lauderdale, FL (US)

( * ) Notice: Subject to any disclaimer, the term of this patent is extended or adjusted under 35 U.S.C. 154(b) by 867 days.

(21) Appl. No.: 12/468,408

(22) Filed: May 19, 2009

(65) Prior Publication Data

US 2009/0292737 A1 Nov. 26, 2009

Related U.S. Application Data

(60) Provisional application No. 61/054,534, filed on May 20, 2008.

(51) Int. Cl.
| | | |
|---|---|---|
| G06F 9/44 | (2006.01) | |
| G06F 12/00 | (2006.01) | |
| G06F 15/16 | (2006.01) | |
| G06F 17/30 | (2006.01) | |
| G06F 7/00 | (2006.01) | |
| G06F 17/00 | (2006.01) | |

(52) U.S. Cl.
USPC .................. 717/170; 707/999.2; 707/623

(58) Field of Classification Search
USPC .................................................. 717/170
See application file for complete search history.

(56) References Cited

U.S. PATENT DOCUMENTS

| | | | |
|---|---|---|---|
| 4,937,036 A | 6/1990 | Beard et al. | |
| 6,075,938 A | 6/2000 | Bugnion et al. | |
| 6,080,207 A | 6/2000 | Kroening et al. | |
| 6,735,601 B1 | 5/2004 | Subrahmanyam | |
| 7,523,110 B2 * | 4/2009 | Holenstein et al. | 707/623 |
| 2005/0149726 A1 | 7/2005 | Joshi et al. | |
| 2005/0289533 A1 * | 12/2005 | Wang et al. | 717/168 |
| 2007/0057958 A1 * | 3/2007 | Bucher et al. | 345/568 |
| 2007/0132774 A1 * | 6/2007 | Fan et al. | 345/564 |
| 2009/0216975 A1 * | 8/2009 | Halperin et al. | 711/162 |

OTHER PUBLICATIONS

International Preliminary Report on Patentability on PCT/US2009/044478 dated Nov. 23, 2010.
International Search Report on PCT/US2009/044478 dated Sep. 11, 2009.
Written Opinion of the International Search Authority on PCT/US2009/044478 dated Nov. 20, 2010.

* cited by examiner

Primary Examiner — Li B Zhen
Assistant Examiner — Arshia S Kia
(74) Attorney, Agent, or Firm — Foley and Lardner LLP; John D. Lanza

(57) ABSTRACT

A method for updating a plurality of disk images, each of the plurality of disk images derived from a common base disk image and a delta image comprising a plurality of delta files, includes applying a delta file to a base disk image to generate a second disk image comprising a portion of the base disk image modified by the delta file and an unmodified portion of the base disk image. Each delta file represents at least one difference between one of the plurality of user disk images and the base disk image. The method includes applying a patch to a copy of the base disk image, and determining that the patch is applied to a portion of the base disk image corresponding to the unmodified portion of the base disk image. The delta file is applied to the patched copy of the base disk image.

23 Claims, 7 Drawing Sheets

METHODS AND SYSTEMS FOR PATCHING MULTIPLE DISK IMAGES DERIVED FROM A COMMON BASE DISK IMAGE

RELATED APPLICATIONS

The present application claims priority to U.S. Provisional Patent Application Ser. No. 61/054,534, filed on May 20, 2008, entitled "Methods and Systems for Patching Multiple Disk Images Derived from a Common Base Image", which is incorporated herein in its entirety by reference.

FIELD OF THE INVENTION

The present disclosure relates to methods and systems for updating a plurality of disk images. In particular, the present disclosure relates to methods and systems for patching multiple disk images derived from a common base disk image.

BACKGROUND OF THE INVENTION

In an environment for centralized management of desktops, multiple client machines receive access to or execute a computing environment based on copies of a single "golden master" desktop disk image. A machine disk image or desktop disk image may be an image of an operating system (OS), and may include sets of applications and customizations representing a working environment for a user. In some environments, a machine image includes files used to execute a virtual machine that then executes an operating system or other user applications. In other environments, a desktop image includes files used to execute an operating system or other user application, and either a physical machine or a virtual machine may execute the desktop image. An image of a machine or desktop may be generally referred to as a disk image.

One aspect of desktop administration is the need to apply changes to either the operating system or to installed applications within the desktop environment, for example, to perform upgrades or other maintenance. In addition, it may be necessary to modify settings to re-align with changes in company policy and to mitigate against security threats. In the case of centralized administration of desktop disk images, common sets of changes, or patches, are typically applied.

In some embodiments, each user has, in effect, their own independent machine image. In one of these embodiments, a change requested by a user to a base disk image is stored in a delta file associated with that user and the combination of the base disk image and one or more delta files associated with that user is referred to as the user's machine disk image. In another of these embodiments, machine disk images are patched individually. This is typically expensive in terms of time taken, as typically each machine is booted, patched and then shut down and re-started. Additionally, this may be expensive in terms of disk usage, as patching will lead to changes in the individual delta files, rather than to changes in the common base disk image. In these embodiments, changes due to a patch are typically applied to the delta files rather than the base disk image, thus ballooning the size of the delta images and increasing storage requirements for the deltas.

In one alternative system, delta disks—which may be disks storing one or more delta files associated with a user—are patched individually and then an external process searches for blocks common to more than one image or delta, and replaces the common blocks with a reference to a single common block. This may reduce the disk storage requirements, but at the cost of additional complexity and possibly runtime overhead. This "scavenging" approach is typically applied at the block level and does not typically identify shared data smaller than a block, or where the same file exists in multiple disk images, but with a different block-level layout. Typically, this approach is provided in environments using Storage Area Networks (SAN).

In other typical environments, a patch is applied to a common disk image and any delta disks are discarded. In one of these embodiments, for example, a system discards the delta image each time the machine is powered off. Files (such as user-generated documents) are usually stored on an external disk, so these are not typically lost with the discarded delta images; however, users are typically not able to permanently install applications or other resources to their disk images. Therefore, in some of these embodiments, discarding deltas whenever a patch is applied may lead to a more limited user experience.

BRIEF SUMMARY OF THE INVENTION

In one aspect, a method and system provide functionality for patching a base disk image without invalidating the delta files. In one embodiment, a method of leveraging existing delta images while applying a patch to a common base disk image to update a plurality of desktop disk images would avoid the high storage and computing costs associated with conventional methods of patching delta files.

In another aspect, a method for updating a plurality of disk images, each of the plurality of disk images derived from a common base disk image and a delta image comprising a plurality of delta files, includes applying a delta file to a base disk image to generate an initial virtual disk image comprising a portion of the base disk image modified by the delta file and an unmodified portion of the base disk image. Each of the delta files may represent at least one difference between one of the plurality of user disk images and the base disk image. The method includes applying a patch to a copy of the base disk image. The method includes determining that the patch is applied to a portion of the base disk image corresponding to the unmodified portion of the base disk image. The method includes applying the delta file to the patched copy of the base disk image.

In one embodiment, the method includes determining that the patch is applied to a portion of the base disk image corresponding to the portion of the base disk image modified by at least one delta file and applying the at least one delta file to the patched copy of the base disk image. In another embodiment, the method includes determining that the patch is applied to a portion of the base disk image corresponding to the portion of the base disk image modified by at least one delta file and determining not to apply the at least one delta file to the patched copy of the base disk image.

In one embodiment, the method includes mounting the base disk image, the initial virtual disk image, and the patched copy of the base disk image in a computing environment. In another embodiment, the method includes mounting the base disk image, the initial virtual disk image, and the patched copy of the base disk image in a virtual machine environment. In still another embodiment, the method includes copying the delta file into a second delta disk image associated with the patched copy of the base disk image, responsive to the determination.

In one embodiment, the method includes applying the delta file of a delta disk image to the base disk image to generate the initial virtual disk image, the delta disk image comprising at least one of a plurality of delta files representing at least one difference between a user disk image and the base disk image.

In another embodiment, the method includes determining, via a merge process, that the patch is applied to a portion of the base disk image corresponding to the unmodified portion of the base disk image. In still another embodiment, the method includes applying, via a merge process, the delta file to the patched copy of the base disk image.

In one embodiment, the method includes determining that the patch is applied to at least one file of the base disk image corresponding to the unmodified portion of the base disk image, and applying the delta file to at least one file of the patched copy of the base disk image. In another embodiment, the method includes determining that the patch is applied to a registry portion of the base disk image corresponding to the modified portion of the base disk image, and merging the delta file, at a registry key level, to a portion of the patched copy of the base disk image corresponding to the modified portion of the base disk image.

In one embodiment, the method includes determining that the patch is applied to one of: a database and a log-file portion of the base disk image corresponding to the modified portion of the base disk image, and merging the delta file, using at least one of: timestamps and heuristics, to a portion of the patched copy of the base disk image corresponding to the modified portion of the base disk image. In another embodiment, the method includes generating a new delta disk image that when applied to the patched copy of the base disk image, generates a first disk image substantially similar to a second disk image generated by applying the patch on the initial virtual disk image. In still another embodiment, the method includes determining, by a rule engine, to apply the delta file the patched copy of the base disk image.

In one embodiment, the method includes applying a patch to the initial virtual disk image, determining that the patch is applied to a portion of the copy of the initial virtual disk image corresponding to a portion of the base disk image modified by a delta file, determining that the patch in the patched copy of the base disk image is applied to a portion of the base disk image unmodified by the delta file, and applying the delta file to the patched copy of the base disk image.

In still another aspect, a system for updating a plurality of user disk images, each of the plurality of disk images derived from a common base disk image and a delta image comprising a plurality of delta files, includes a base disk image, a delta disk image, a patch and a computing environment. The system includes means for applying a delta file to a base disk image to generate an initial virtual disk image comprising a portion of the base disk image modified by the delta file and an unmodified portion of the base disk image. The system includes means for applying a patch to a copy of the base disk image. The computing environment includes means for determining that the patch is applied to a portion of the base disk image corresponding to the unmodified portion of the base disk image. The computing environment includes means for applying the delta file to the patched copy of the base disk image.

In one embodiment, the system includes a delta disk image for storing the plurality of delta files, each delta file representing at least one difference between a user disk image and the base disk image. In another embodiment, the computing environment is a virtual machine environment. In still another embodiment, the computing environment includes means for manipulating files between disk image format and delta file format. In yet another embodiment, the computing environment includes an operating system and at least one tool for manipulating disk images. In yet even another embodiment, the computing environment includes a tool for reading and writing disk images.

BRIEF DESCRIPTION OF THE DRAWINGS

The foregoing and other objects, aspects, features, and advantages of the disclosure will become more apparent and better understood by referring to the following description taken in conjunction with the accompanying drawings, in which.

DETAILED DESCRIPTION OF THE INVENTION

Figure 1A:
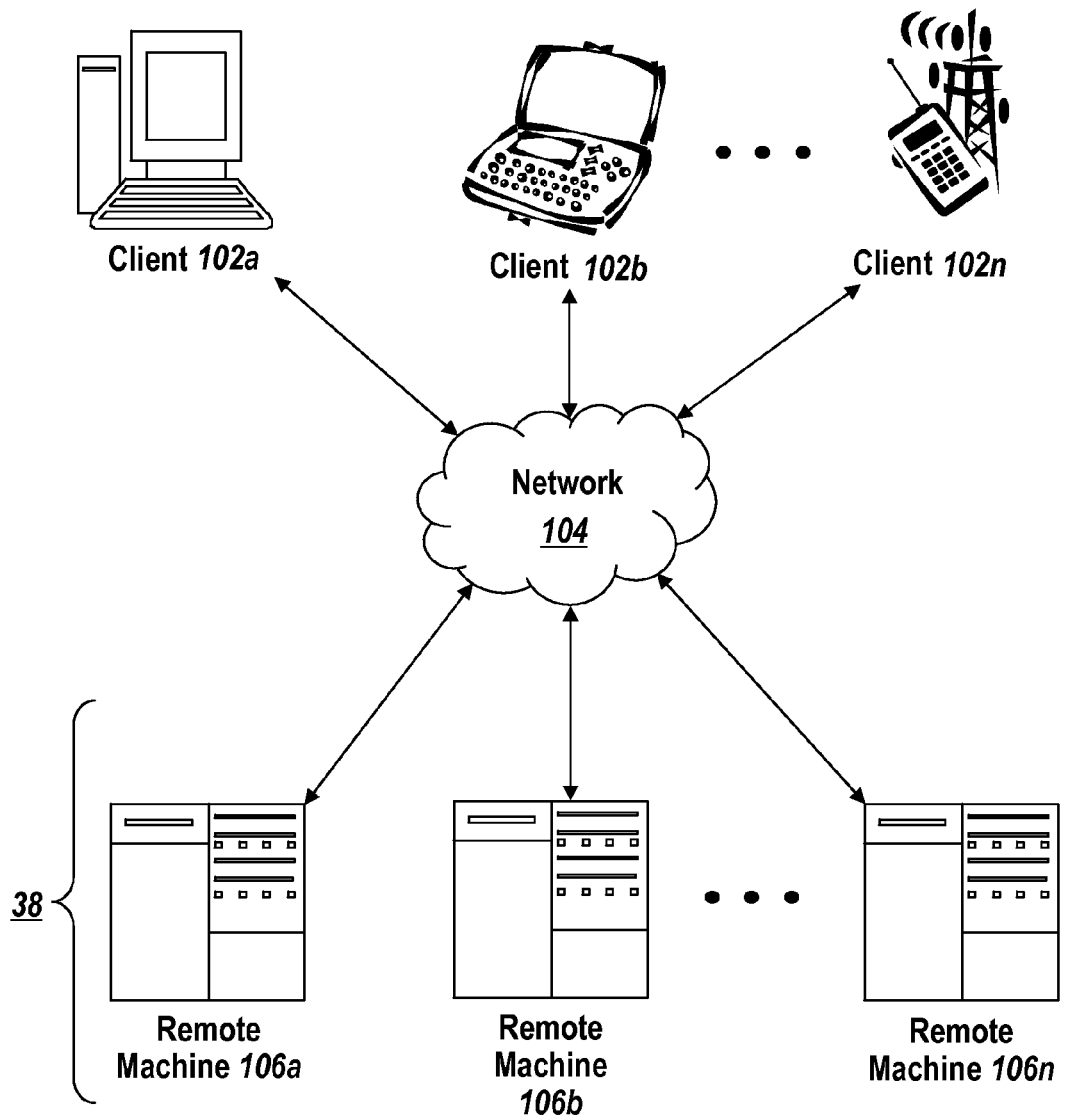
FIG. 1A is a block diagram depicting an embodiment of a network environment comprising client machines in communication with remote machines.

Referring now to FIG. 1A, an embodiment of a network environment is depicted. In brief overview, the network environment comprises one or more clients 102a-102n (also generally referred to as local machine(s) 102, client(s) 102, client node(s) 102, client machine(s) 102, client computer(s) 102, client device(s) 102, endpoint(s) 102, or endpoint node(s) 102) in communication with one or more remote machines 106a-106n (also generally referred to as server(s) 106 or remote machine(s) 106) via one or more networks 104. In some embodiments, a client 102 has the capacity to function as both a client node seeking access to resources provided by a server and as a server providing access to hosted resources for other clients 102a-102n.

Although FIG. 1A shows a network 104 between the clients 102 and the remote machines 106, the clients 102 and the remote machines 106 may be on the same network 104. The network 104 can be a local-area network (LAN), such as a company Intranet, a metropolitan area network (MAN), or a wide area network (WAN), such as the Internet or the World Wide Web. In some embodiments, there are multiple networks 104 between the clients 102 and the remote machines 106. In one of these embodiments, a network 104' (not shown) may be a private network and a network 104 may be a public network. In another of these embodiments, a network 104 may be a private network and a network 104' a public network. In still another embodiment, networks 104 and 104' may both be private networks.

The network 104 may be any type and/or form of network and may include any of the following: a point to point network, a broadcast network, a wide area network, a local area network, a telecommunications network, a data communication network, a computer network, an ATM (Asynchronous Transfer Mode) network, a SONET (Synchronous Optical Network) network, a SDH (Synchronous Digital Hierarchy) network, a wireless network and a wireline network. In some embodiments, the network 104 may comprise a wireless link, such as an infrared channel or satellite band. The topology of the network 104 may be a bus, star, or ring network topology. The network 104 may be of any such network topology as known to those ordinarily skilled in the art capable of supporting the operations described herein. The network may comprise mobile telephone networks utilizing any protocol or protocols used to communicate among mobile devices, including AMPS, TDMA, CDMA, GSM, GPRS or UMTS. In some embodiments, different types of data may be transmitted via different protocols. In other embodiments, the same types of data may be transmitted via different protocols.

In some embodiments, the system may include multiple, logically-grouped remote machines 106. In one of these embodiments, the logical group of remote machines may be referred to as a server farm 38. In another of these embodiments, the remote machines 106 may be geographically dispersed. In other embodiments, a server farm 38 may be administered as a single entity. In still other embodiments, the server farm 38 comprises a plurality of server farms 38. The remote machines 106 within each server farm 38 can be heterogeneous—one or more of the remote machines 106 can operate according to one type of operating system platform (e.g., WINDOWS NT, manufactured by Microsoft Corp. of Redmond, Wash.), while one or more of the other remote machines 106 can operate on according to another type of operating system platform (e.g., Unix or Linux).

The remote machines 106 of each server farm 38 do not need to be physically proximate to another remote machine 106 in the same server farm 38. Thus, the group of remote machines 106 logically grouped as a server farm 38 may be interconnected using a wide-area network (WAN) connection or a metropolitan-area network (MAN) connection. For example, a server farm 38 may include remote machines 106 physically located in different continents or different regions of a continent, country, state, city, campus, or room. Data transmission speeds between remote machines 106 in the server farm 38 can be increased if the remote machines 106 are connected using a local-area network (LAN) connection or some form of direct connection.

A remote machine 106 may be a file server, application server, web server, proxy server, appliance, network appliance, gateway, application gateway, gateway server, virtualization server, deployment server, SSL VPN server, or firewall. In some embodiments, a remote machine 106 provides a remote authentication dial-in user service, and is referred to as a RADIUS server. In other embodiments, a remote machine 106 may have the capacity to function as either an application server or as a master application server. In still other embodiments, a remote machine 106 is a blade server. In yet other embodiments, a remote machine 106 executes a virtual machine providing, to a user or client computer 102, access to a computing environment.

In one embodiment, a remote machine 106 may include an Active Directory. The remote machine 106 may be an application acceleration appliance. For embodiments in which the remote machine 106 is an application acceleration appliance, the remote machine 106 may provide functionality including firewall functionality, application firewall functionality, or load balancing functionality. In some embodiments, the remote machine 106 comprises an appliance such as one of the line of appliances manufactured by the Citrix Application Networking Group, of San Jose, Calif., or Silver Peak Systems, Inc., of Mountain View, Calif., or of Riverbed Technology, Inc., of San Francisco, Calif., or of F5 Networks, Inc., of Seattle, Wash., or of Juniper Networks, Inc., of Sunnyvale, Calif.

In some embodiments, a remote machine 106 executes an application on behalf of a user of a client 102. In other embodiments, a remote machine 106 executes a virtual machine, which provides an execution session within which applications execute on behalf of a user or a client 102. In one of these embodiments, the execution session is a hosted desktop session. In another of these embodiments, the execution session provides access to a computing environment, which may comprise one or more of: an application, a plurality of applications, a desktop application, and a desktop session in which one or more applications may execute.

In some embodiments, a client 102 communicates with a remote machine 106. In one embodiment, the client 102 communicates directly with one of the remote machines 106 in a server farm 38. In another embodiment, the client 102 executes a program neighborhood application to communicate with a remote machine 106 in a server farm 38. In still another embodiment, the remote machine 106 provides the functionality of a master node. In some embodiments, the client 102 communicates with the remote machine 106 in the server farm 38 through a network 104. Over the network 104, the client 102 can, for example, request execution of various applications hosted by the remote machines 106a-106n in the server farm 38 and receive output of the results of the application execution for display. In some embodiments, only the master node provides the functionality required to identify and provide address information associated with a remote machine 106b hosting a requested application.

In one embodiment, the remote machine 106 provides the functionality of a web server. In another embodiment, the remote machine 106a receives requests from the client 102, forwards the requests to a second remote machine 106b and responds to the request by the client 102 with a response to the request from the remote machine 106b. In still another embodiment, the remote machine 106a acquires an enumeration of applications available to the client 102 and address information associated with a remote machine 106b hosting an application identified by the enumeration of applications. In yet another embodiment, the remote machine 106 presents the response to the request to the client 102 using a web interface. In one embodiment, the client 102 communicates directly with the remote machine 106 to access the identified application. In another embodiment, the client 102 receives output data, such as display data, generated by an execution of the identified application on the remote machine 106.

In some embodiments, the remote machine 106 or a server farm 38 may be running one or more applications, such as an application providing a thin-client computing or remote display presentation application. In one embodiment, the remote machine 106 or server farm 38 executes as an application any portion of the CITRIX ACCESS SUITE by Citrix Systems, Inc., such as the METAFRAME or CITRIX PRESENTATION SERVER, CITRIX XEN APP, CITRIX XEN DESKTOP, CITRIX XEN SERVER, and/or any of the MICROSOFT WINDOWS TERMINAL SERVICES manufactured by the Microsoft Corporation. In another embodiment, the application is an Independent Computing Architecture (ICA) client, developed by Citrix Systems, Inc. of Fort Lauderdale, Fla. In still another embodiment, the remote machine 106 may run an application, which, for example, may be an application server providing email services such as MICROSOFT EXCHANGE manufactured by the Microsoft Corporation of Redmond, Wash., a web or Internet server, or a desktop sharing server, or a collaboration server. In yet another embodiment, any of the applications may comprise any type of hosted service or products, such as GOTOMEETING provided by Citrix Online Division, Inc. of Santa Barbara, Calif., WEBEX provided by WebEx, Inc. of Santa Clara, Calif., or Microsoft Office LIVE MEETING provided by Microsoft Corporation of Redmond, Wash.

A client 102 may execute, operate or otherwise provide an application, which can be any type and/or form of software, program, or executable instructions such as any type and/or form of web browser, web-based client, client-server application, a thin-client computing client, an ActiveX control, or a Java applet, or any other type and/or form of executable instructions capable of executing on client 102. In some embodiments, the application may be a server-based or a remote-based application executed on behalf of the client 102 on a remote machine 106. In one embodiments the remote machine 106 may display output to the client 102 using any thin-client or remote-display protocol, such as the Independent Computing Architecture (ICA) protocol manufactured by Citrix Systems, Inc. of Ft. Lauderdale, Fla. or the Remote Desktop Protocol (RDP) manufactured by the Microsoft Corporation of Redmond, Wash. The application can use any type of protocol and it can be, for example, an HTTP client, an FTP client, an Oscar client, or a Telnet client. In other embodiments, the application comprises any type of software related to voice over internet protocol (VoIP) communications, such as a soft IP telephone. In further embodiments, the application comprises any application related to real-time data communications, such as applications for streaming video and/or audio.

Figure 1B:
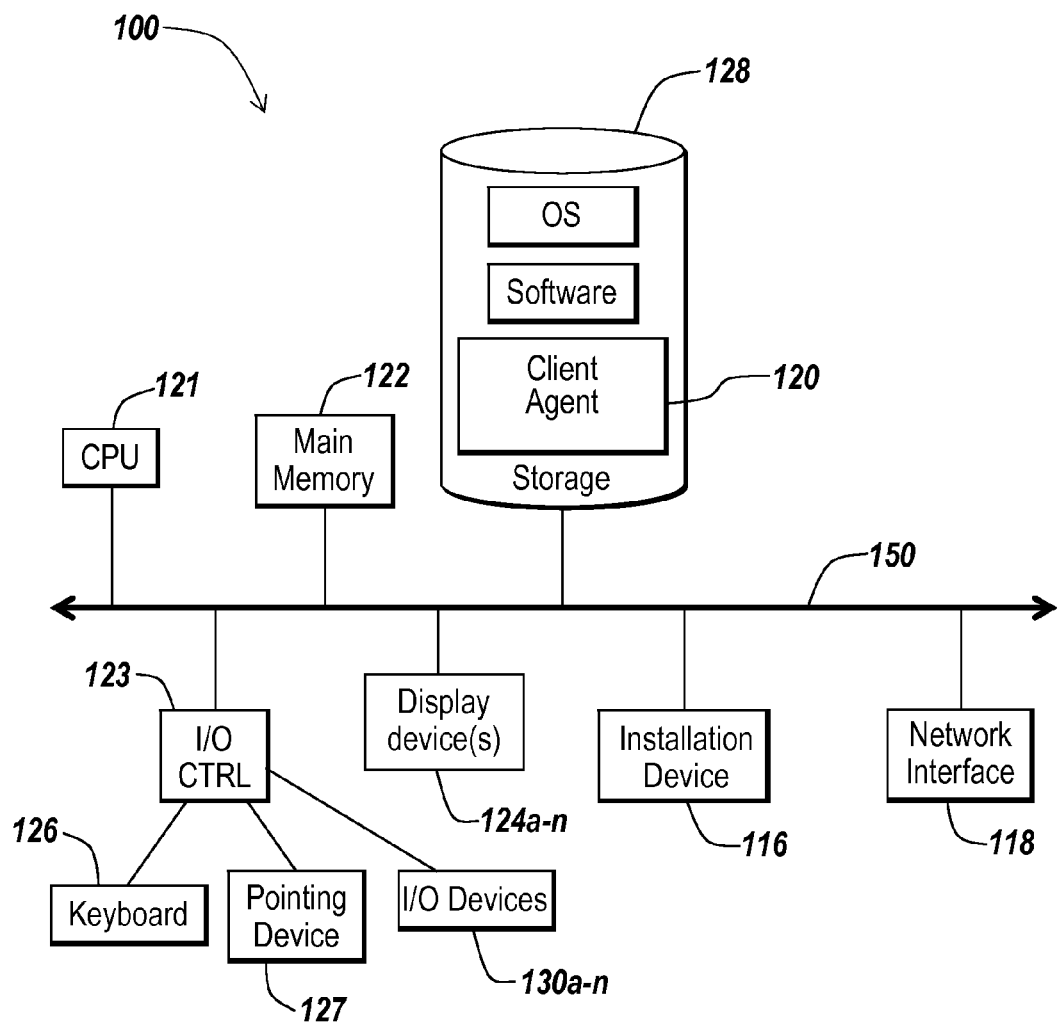
FIGS. 1B and 1C are block diagrams depicting embodiments of computers useful in connection with the methods and systems described herein.
Figure 1C:
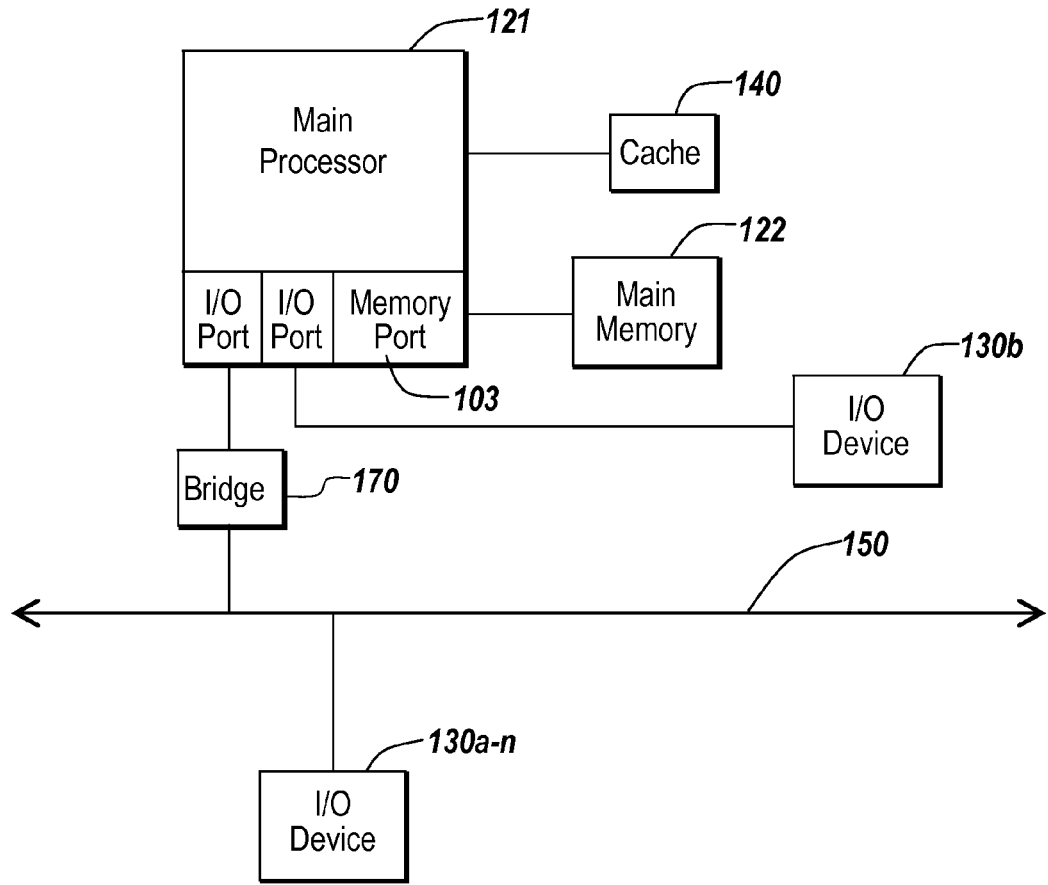

The client 102 and remote machine 106 may be deployed as and/or executed on any type and form of computing device, such as a computer, network device or appliance capable of communicating on any type and form of network and performing the operations described herein. FIGS. 1B and 1C depict block diagrams of a computing device 100 useful for practicing an embodiment of the client 102 or a remote machine 106. As shown in FIGS. 1B and 1C, each computing device 100 includes a central processing unit 121, and a main memory unit 122. As shown in FIG. 1B, a computing device 100 may include a storage device 128, an installation device 116, a network interface 118, an I/O controller 123, display devices 124a-102n, a keyboard 126 and a pointing device 127, such as a mouse. The storage device 128 may include, without limitation, an operating system, software, and a client agent 120. As shown in FIG. 1C, each computing device 100 may also include additional optional elements, such as a memory port 103, a bridge 170, one or more input/output devices 130a-130n (generally referred to using reference numeral 130), and a cache memory 140 in communication with the central processing unit 121

The central processing unit 121 is any logic circuitry that responds to and processes instructions fetched from the main memory unit 122. In many embodiments, the central processing unit 121 is provided by a microprocessor unit, such as: those manufactured by Intel Corporation of Mountain View, Calif.; those manufactured by Motorola Corporation of Schaumburg, Ill.; those manufactured by Transmeta Corporation of Santa Clara, Calif.; the RS/6000 processor, those manufactured by International Business Machines of White Plains, N.Y.; or those manufactured by Advanced Micro Devices of Sunnyvale, Calif. The computing device 100 may be based on any of these processors, or any other processor capable of operating as described herein.

Main memory unit 122 may be one or more memory chips capable of storing data and allowing any storage location to be directly accessed by the microprocessor 121, such as Static random access memory (SRAM), Burst SRAM or Synch-Burst SRAM (BSRAM), Dynamic random access memory (DRAM), Fast Page Mode DRAM (FPM DRAM), Enhanced DRAM (EDRAM), Extended Data Output RAM (EDO RAM), Extended Data Output DRAM (EDO DRAM), Burst Extended Data Output DRAM (BEDO DRAM), Enhanced DRAM (EDRAM), synchronous DRAM (SDRAM), JEDEC SRAM, PC100 SDRAM, Double Data Rate SDRAM (DDR SDRAM), Enhanced SDRAM (ESDRAM), SyncLink DRAM (SLDRAM), Direct Rambus DRAM (DRDRAM), or Ferroelectric RAM (FRAM). The main memory 122 may be based on any of the above described memory chips, or any other available memory chips capable of operating as described herein. In the embodiment shown in FIG. 1B, the processor 121 communicates with main memory 122 via a system bus 150 (described in more detail below). FIG. 1C depicts an embodiment of a computing device 100 in which the processor communicates directly with main memory 122 via a memory port 103. For example, in FIG. 1C the main memory 122 may be DRDRAM.

FIG. 1C depicts an embodiment in which the main processor 121 communicates directly with cache memory 140 via a secondary bus, sometimes referred to as a backside bus. In other embodiments, the main processor 121 communicates with cache memory 140 using the system bus 150. Cache memory 140 typically has a faster response time than main memory 122 and is typically provided by SRAM, BSRAM, or EDRAM. In the embodiment shown in FIG. 1C, the processor 121 communicates with various I/O devices 130 via a local system bus 150. Various buses may be used to connect the central processing unit 121 to any of the I/O devices 130, including a VESA VL bus, an ISA bus, an EISA bus, a MicroChannel Architecture (MCA) bus, a PCI bus, a PCI-X bus, a PCI-Express bus, or a NuBus. For embodiments in which the I/O device is a video display 124, the processor 121 may use an Advanced Graphics Port (AGP) to communicate with the display 124. FIG. 1C depicts an embodiment of a computer 100 in which the main processor 121 communicates directly with I/O device 130b via HYPERTRANSPORT, RAPIDIO, or INFINIBAND communications technology. FIG. 1C also depicts an embodiment in which local busses and direct communication are mixed: the processor 121 communicates with I/O device 130a using a local interconnect bus while communicating with I/O device 130b directly.

A wide variety of I/O devices 130a-130n may be present in the computing device 100. Input devices include keyboards, mice, trackpads, trackballs, microphones, and drawing tablets. Output devices include video displays, speakers, inkjet printers, laser printers, and dye-sublimation printers. The I/O devices may be controlled by an I/O controller 123 as shown in FIG. 1B. The I/O controller may control one or more I/O devices such as a keyboard 126 and a pointing device 127, e.g., a mouse or optical pen. Furthermore, an I/O device may also provide storage and/or an installation medium 116 for the computing device 100. In still other embodiments, the computing device 100 may provide USB connections (not shown) to receive handheld USB storage devices such as the USB Flash Drive line of devices manufactured by Twintech Industry, Inc. of Los Alamitos, Calif.

Referring again to FIG. 1B, the computing device 100 may support any suitable installation device 116, such as a floppy disk drive for receiving floppy disks such as 3.5-inch, 5.25-inch disks or ZIP disks, a CD-ROM drive, a CD-R/RW drive, a DVD-ROM drive, tape drives of various formats, USB device, hard-drive or any other device suitable for installing software and programs. The computing device 100 may further comprise a storage device, such as one or more hard disk drives or redundant arrays of independent disks, for storing an operating system and other related software, and for storing application software programs such as any program related to the client agent 120. Optionally, any of the installation devices 116 could also be used as the storage device. Additionally, the operating system and the software can be run from a bootable medium, for example, a bootable CD, such as KNOPPIX, a bootable CD for GNU/Linux that is available as a GNU/Linux distribution from knoppix.net.

Furthermore, the computing device 100 may include a network interface 118 to interface to the network 104 through a variety of connections including, but not limited to, standard telephone lines, LAN or WAN links (e.g., 802.11, T1, T3, 56 kb, X.25, SNA, DECNET), broadband connections (e.g., ISDN, Frame Relay, ATM, Gigabit Ethernet, Ethernet-over-SONET), wireless connections, or some combination of any or all of the above. Connections can be established using a variety of communication protocols (e.g., TCP/IP, IPX, SPX, NetBIOS, Ethernet, ARCNET, SONET, SDH, Fiber Distributed Data Interface (FDDI), RS232, IEEE 802.11, IEEE 802.11a, IEEE 802.11b, IEEE 802.11g, CDMA, GSM, WiMax and direct asynchronous connections). In one embodiment, the computing device 100 communicates with other computing devices 100' via any type and/or form of gateway or tunneling protocol such as Secure Socket Layer (SSL) or Transport Layer Security (TLS), or the Citrix Gateway Protocol manufactured by Citrix Systems, Inc. of Ft. Lauderdale, Fla. The network interface 118 may comprise a built-in network adapter, network interface card, PCMCIA network card, card bus network adapter, wireless network adapter, USB network adapter, modem or any other device suitable for interfacing the computing device 100 to any type of network capable of communication and performing the operations described herein.

In some embodiments, the computing device 100 may comprise or be connected to multiple display devices 124a-124n, which each may be of the same or different type and/or form. As such, any of the I/O devices 130a-130n and/or the I/O controller 123 may comprise any type and/or form of suitable hardware, software, or combination of hardware and software to support, enable or provide for the connection and use of multiple display devices 124a-124n by the computing device 100. For example, the computing device 100 may include any type and/or form of video adapter, video card, driver, and/or library to interface, communicate, connect or otherwise use the display devices 124a-124n. In one embodiment, a video adapter may comprise multiple connectors to interface to multiple display devices 124a-124n. In other embodiments, the computing device 100 may include multiple video adapters, with each video adapter connected to one or more of the display devices 124a-124n. In some embodiments, any portion of the operating system of the computing device 100 may be configured for using multiple displays 124a-124n. In other embodiments, one or more of the display devices 124a-124n may be provided by one or more other computing devices, such as computing devices 100a and 100b connected to the computing device 100, for example, via a network. These embodiments may include any type of software designed and constructed to use another computer's display device as a second display device 124a for the computing device 100. One ordinarily skilled in the art will recognize and appreciate the various ways and embodiments that a computing device 100 may be configured to have multiple display devices 124a-124n.

In further embodiments, an I/O device 130 may be a bridge between the system bus 150 and an external communication bus, such as a USB bus, an Apple Desktop Bus, an RS-232 serial connection, a SCSI bus, a FireWire bus, a FireWire 800 bus, an Ethernet bus, an AppleTalk bus, a Gigabit Ethernet bus, an Asynchronous Transfer Mode bus, a HIPPI bus, a Super HIPPI bus, a SerialPlus bus, a SCI/LAMP bus, a Fibre-Channel bus, or a Serial Attached small computer system interface bus.

A computing device 100 of the sort depicted in FIGS. 1B and 1C typically operates under the control of operating systems, which control scheduling of tasks and access to system resources. The computing device 100 can be running any operating system such as any of the versions of the MICROSOFT WINDOWS operating systems, the different releases of the Unix and Linux operating systems, any version of the MAC operating system for Macintosh computers, any embedded operating system, any real-time operating system, any open source operating system, any proprietary operating system, any operating systems for mobile computing devices, or any other operating system capable of running on the computing device and performing the operations described herein. Typical operating systems include, but are not limited to: WINDOWS 3.x, WINDOWS 95, WINDOWS 98, WINDOWS 2000, WINDOWS NT 3.51, WINDOWS NT 4.0, WINDOWS CE, WINDOWS XP, and WINDOWS VISTA, all of which are manufactured by Microsoft Corporation of Redmond, Wash.; MAC operating system, manufactured by Apple Inc., of Cupertino, Calif.; OS/2, manufactured by International Business Machines of Armonk, N.Y.; and Linux, a freely-available operating system distributed by Caldera Corp. of Salt Lake City, Utah, or any type and/or form of a Unix operating system, among others.

The computing device 100 can be any workstation, desktop computer, laptop or notebook computer, server, handheld computer, mobile telephone or other portable telecommunication device, media playing device, a gaming system, mobile computing device, or any other type and/or form of computing, telecommunications or media device that is capable of communication and that has sufficient processor power and memory capacity to perform the operations described herein. For example, the computing device 100 may comprise a device of the IPOD family of devices manufactured by Apple Inc., of Cupertino, Calif., a PLAYSTATION 2, PLAYSTATION 3, or PERSONAL PLAYSTATION PORTABLE (PSP) device manufactured by the Sony Corporation of Tokyo, Japan, a NINTENDO DS, NINTENDO GAMEBOY, NINTENDO GAMEBOY ADVANCED or NINTENDO REVOLUTION device manufactured by Nintendo Co., Ltd., of Kyoto, Japan, or an XBOX or XBOX 360 device manufactured by the Microsoft Corporation of Redmond, Wash.

In some embodiments, the computing device 100 may have different processors, operating systems, and input devices consistent with the device. For example, in one embodiment, the computing device 100 is a TREO 180, 270, 600, 650, 680, 700p, 700w/wx, 750, 755p, 800w, Centro, or Pro smart phone manufactured by Palm, Inc. In some of these embodiments, the TREO smart phone is operated under the control of the PalmOS operating system and includes a stylus input device as well as a five-way navigator device.

In other embodiments, the computing device 100 is a mobile device, such as a JAVA-enabled cellular telephone or personal digital assistant (PDA), such as the i55sr, i58sr, i85s, i88s, i90c, i95c1, i335, i365, i570, I576, i580, i615, i760, i836, i850, i870, i880, i920, i930, ic502, ic602, ic902, i776 or the im1100, all of which are manufactured by Motorola Corp. of Schaumburg, Ill., the 6035 or the 7135, manufactured by Kyocera of Kyoto, Japan, or the i300 or i330, manufactured by Samsung Electronics Co., Ltd., of Seoul, Korea. In some embodiments, the computing device 100 is a mobile device manufactured by Nokia of Finland, or by Sony Ericsson Mobile Communications AB of Lund, Sweden.

In still other embodiments, the computing device 100 is a Blackberry handheld or smart phone, such as the devices manufactured by Research In Motion Limited, including the Blackberry 7100 series, 8700 series, 7700 series, 7200 series, the Blackberry 7520, the Blackberry PEARL 8100, the 8700 series, the 8800 series, the Blackberry Storm, Blackberry Bold, Blackberry Curve 8900, and the Blackberry Pearl Flip. In yet other embodiments, the computing device 100 is a smart phone, Pocket PC, Pocket PC Phone, or other handheld mobile device supporting Microsoft Windows Mobile Software. Moreover, the computing device 100 can be any workstation, desktop computer, laptop or notebook computer, server, handheld computer, mobile telephone, any other computer, or other form of computing or telecommunications device that is capable of communication and that has sufficient processor power and memory capacity to perform the operations described herein.

In some embodiments, the computing device 100 is a digital audio player. In one of these embodiments, the computing device 100 is a digital audio player such as the Apple IPOD, IPOD Touch, IPOD NANO, and IPOD SHUFFLE lines of devices, manufactured by Apple Inc., of Cupertino, Calif. In another of these embodiments, the digital audio player may function as both a portable media player and as a mass storage device. In other embodiments, the computing device 100 is a digital audio player such as the DigitalAudioPlayer Select MP3 players, manufactured by Samsung Electronics America, of Ridgefield Park, N.J., or the Motorola m500 or m25 Digital Audio Players, manufactured by Motorola Inc. of Schaumburg, Ill. In still other embodiments, the computing device 100 is a portable media player, such as the Zen Vision W, the Zen Vision series, the Zen Portable Media Center devices, or the Digital MP3 line of MP3 players, manufactured by Creative Technologies Ltd. In yet other embodiments, the computing device 100 is a portable media player or digital audio player supporting file formats including, but not limited to, MP3, WAV, M4A/AAC, WMA Protected AAC, AIFF, Audible audiobook, Apple Lossless audio file formats and .mov, .m4v, and .mp4 MPEG-4 (H.264/MPEG-4 AVC) video file formats.

In some embodiments, the computing device 100 comprises a combination of devices, such as a mobile phone combined with a digital audio player or portable media player. In one of these embodiments, the computing device 100 is a Motorola RAZR or Motorola ROKR line of combination digital audio players and mobile phones. In another of these embodiments, the computing device 100 is an iPhone smartphone, manufactured by Apple Inc., of Cupertino, Calif.

Although referred to generally desktop disk images, this disclosure is not limited to desktop disk images, and includes other embodiments of images such as server disk images. In some environments for centralized management of desktops, multiple client machines 102 receive copies of a single "golden master" desktop disk image. In one embodiment, a desktop disk image includes files used to execute an operating system—an image of an operating system. In another embodiment, the desktop disk image may include a set of applications and customizations. In still another embodiment, the desktop disk image represents a working environment for a user. In yet another embodiment, a desktop disk image may also be referred to as a machine disk image. In some embodiments, a copy of the master desktop disk image provided to a user by a client machine 102 evolves with time, diverging further from the master desktop disk image as each user applies changes to their working environment. For example, changes resulting from modifying settings, adding or deleting information, and installing new applications may result in differences between one copy and another and between one copy and the master desktop disk image.

Figure 1D:
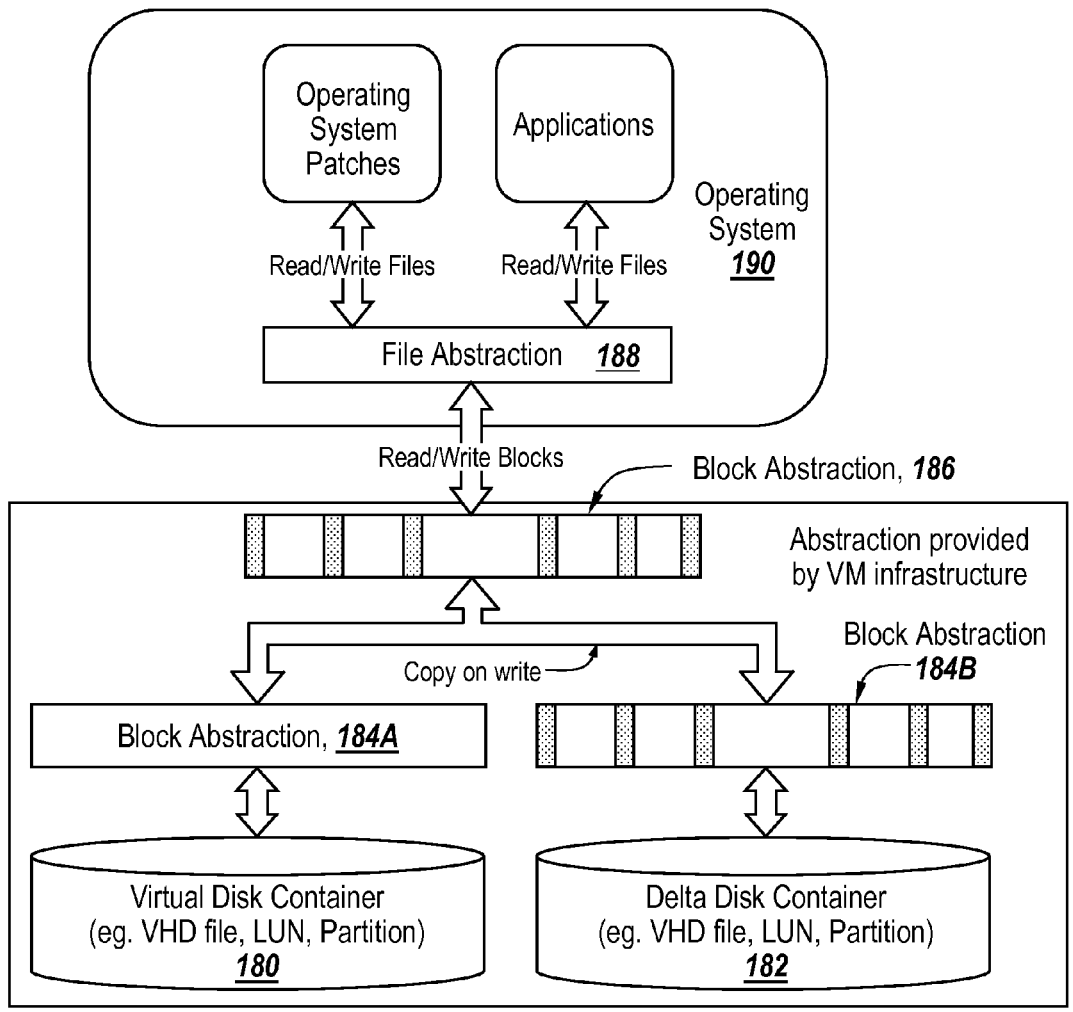
FIG. 1D is a block diagram depicting an embodiment of the way delta disks are constructed and used in virtual machines in the prior art.

Referring now to FIG. 1D, a block diagram depicts one embodiment of a conventional system for maintaining a desktop disk image for a user. To mitigate storage costs for managing a plurality of desktops, a typical approach involves representing each user's desktop environment as a set of differences from a common base disk image 180, i.e., a delta file identifying at least one user-requested modification. In one embodiment, the common base disk image 180 represents an initial image from which subsequent copies evolved. This approach is commonly supported, for example in a virtual machine environment, such as those provided by Citrix Provisioning Server or Citrix XEN SERVER manufactured by Citrix Systems, Inc, or those provided by VMWare ESX, manufactured by VMWare, Inc. To illustrate the storage requirements in such environments, if each image is 10 GB, and 8 GB of this is from the common disk image, then the cost for 10 users would be 8 GB+10×2 GB=28 GB, rather than 10×10 GB=100 GB as would be needed if delta files were not used.

In one virtual machine environment, delta files are commonly generated by a "copy on write" process. In another embodiment, a virtual machine is instantiated using a base disk image 180, or a representation of a disk stored as a file. Other techniques include providing the base disk image 180 as a logical volume accessed via network attached storage. In one embodiment, when the operating system or applications running in the virtual machine executed based upon the base disk image 180 attempt to write new or changed data to the base disk image 180, these changes may be automatically copied or deposited into a secondary or "delta" disk 182. In another embodiment, this implementation enables one base disk image 180 to be used by many virtual machines. In still another embodiment, for a plurality of desktop disk images 190, individual customizations with respect to the common base disk image 180 can then be tracked and contained in separate delta disks 182 corresponding to each of a plurality of modified desktop disk images 190. In some embodiments, a base disk image 180 may be represented as a base disk image 180 and at least one delta disk image, for example, as a single logical unit. In one embodiment, the base disk image component and each of the delta disk image component of the logical unit may be accessed and/or manipulated without affecting the other components.

In one embodiment, a virtual machine may include four levels:

Level 0) a container 180 for a virtualized disk, for example, a file or set of files (such as a logical unit, virtual hard drive image, or disk partition), which may be used to instantiate a virtual machine;

Level 1) a block abstraction 184A representing a physical disk to applications executing above the block abstraction 184A;

Level 1a) a set of delta blocks to support 'copy on write' functionality. These are typically stored in a second container 182;

Level 2) a file system abstraction 188, an example of which is New Technology File System (NTFS); and Level 3) files 190 representing an operating system, applications and data.

In one embodiment of a virtual machine environment, using a standard "copy on write" delta disk system, delta files are described in terms of blocks that have been changed. In another embodiment, a plurality of delta files that represent changes made to a block abstraction 184b is stored in the delta disk 182. In still another embodiment, a delta disk system describes delta files in terms of files that have been changed. In yet another embodiment, operations involving delta files may be performed at the block level, at the file level, or at both levels.

In one embodiment, when patches are applied, the changes to each machine may be substantially similar, and are shared. In another embodiment, those substantially similar changes are applied and retained on the base disk image, rather than transferred to each of the delta images. In still another embodiment, however, if a base disk image 180 was separately mounted and patched (without reference to a delta disk 182) and if files were modified by a delta, then the arrangement of blocks within the base image might change such that the delta would no longer accurately identify modifications to data requested by a user. The methods and systems described herein provide a solution for updating a plurality of disk images derived from a common base disk image without invalidating delta files.

Figure 2:
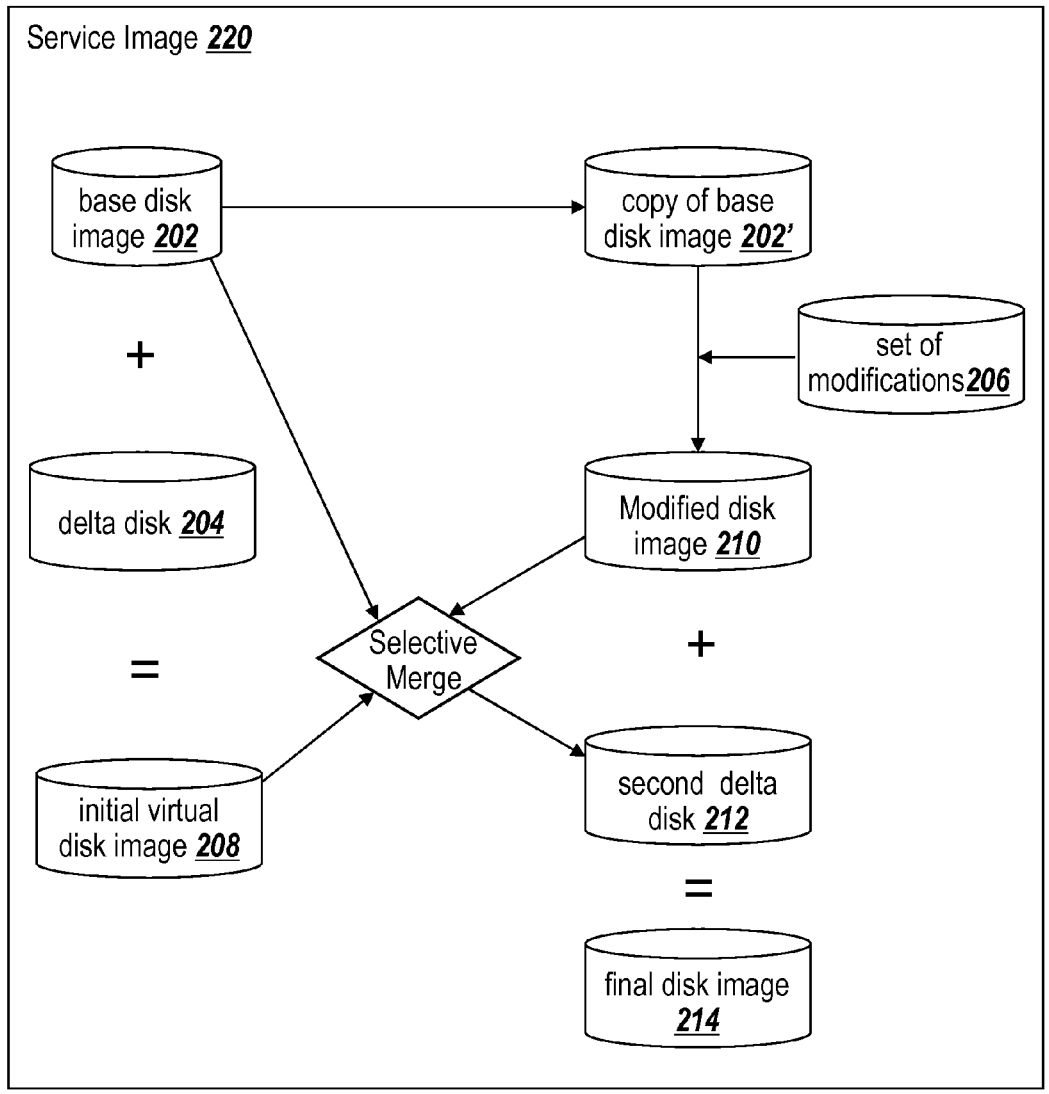
FIG. 2 is a block diagram depicting an embodiment of a system for updating a plurality of disk images derived from a common base disk image and a plurality of delta files.

Referring now to FIG. 2, a block diagram depicts one embodiment of a system for updating a plurality of disk images derived from a common base disk image 202. In brief overview, the system includes a service image 220, a base disk image 202, one of a plurality of delta disks 204, a patch or common set of modifications 206, a copy of the common base disk image 202', a second delta disk 212, a final disk image 214, and mounted disks representing the common base disk image 202, a modified disk image disk 210, and an initial virtual disk image 208. In one embodiment, the service image 220 provides a computing environment that is able to read, write and create delta images, and is able to interpret the disk stacks. In another embodiment, the service image 220 is a computing environment. In still another embodiment, the service image 220 is a collection of at least one tool.

In one embodiment, the service image 220 includes an operating system and a set of tools, which perform operations on data. In another embodiment, the service image 220 includes at least one tool for manipulating disk images, including delta disks. In still another embodiment, the service image 220 includes at least one tool for manipulating files between disk image format and delta file format. In still even another embodiment, the service image 220 mounts one or more of the base disk image 202, the copy of the base disk image 202', the modified disk image 210, and the initial virtual disk image 208 in a computing environment provided by the service image 220. In yet another embodiment, the computing environment is a virtual machine environment. In some embodiments, the corresponding stack of a virtual machine and a compatible operating system are used in a service image 220 that interprets the stack. In other embodiments, the service image 220 is capable of reading from and writing to disk image and delta files, and of reading from and writing to the file systems used by disk images and delta disks.

In one embodiment, the service image 220 includes functionality for applying a delta file from the delta disk 204 to a base disk image 202 to generate an initial virtual disk image 208 comprising a portion of the base disk image modified by the delta file and an unmodified portion of the base disk image. In another embodiment, the service image 220 includes functionality for applying a patch 206 to a copy of the base disk image 202'. In still another embodiment, the service image 220 includes functionality for determining that the patch 206 is applied to a portion of the base disk image 202 corresponding to the unmodified portion of the base disk image 202. In yet another embodiment, the service image 220 includes functionality for applying the delta file from the delta disk 204 to the patched copy 210 of the base disk image 202. In some embodiments, the service image 220 includes a tool for identifying a file listed in a directory of files stored on a mounted image.

In some embodiments, a computing device 100 executes a tool that provides the functionality described in connection with the service image. In one of these embodiments, the tool is a software application executed. In another of these embodiments, the tool may be executed to provide the functionality of a service image without requiring execution of a service image. In still another of these embodiments, the tool includes functionality for applying a delta file from the delta disk 204 to a base disk image 202 to generate an initial virtual disk image 208 comprising a portion of the base disk image modified by the delta file and an unmodified portion of the base disk image. In another of these embodiments, the tool includes functionality for applying a patch 206 to a copy of the base disk image 202'. In still even another of these embodiments, the tool includes functionality for determining that the patch 206 is applied to a portion of the base disk image 202 corresponding to the unmodified portion of the base disk image 202. In yet another of these embodiments, the tool includes functionality for applying the delta file from the delta disk 204 to the patched copy 210 of the base disk image 202.

In one embodiment, the base disk image 202 is an image with which a computing device 100 can execute a virtual machine. In another embodiment, the base disk image 202 is mounted in a computing environment provided by the service image 220. In still another embodiment, the base disk image 202 is not mounted by the service image 220.

In one embodiment, the base disk image 202 functions as a reference image in a merge process, with respect to the modified disk image 210 and the initial virtual disk image 208. In still another embodiment, the merge process is a classical "three-way merge process" using a reference and two modified versions of the reference. In still even another embodiment, the merge process generates a second delta image 212 incorporating the changes from the set of modifications 206. In yet another embodiment, the computing environment provided by the service image 220 implements the merge process, through use of one of the tools included in the service image 220.

In one embodiment, the copy of the base disk image 202' is a deep copy of the base disk image 202. In another embodiment, a deep copy is a complete copy of the base disk image 202. In still another embodiment, a service image 220 creates a copy of all files in a base disk image 202, which is referred to as a deep copy of the base disk image 202, as opposed to creating an empty delta disk associated with the base disk image, which will store any delta files subsequently created by a user of the base disk image 202 and which may be referred to as a shallow copy of the base disk image 202. In yet another embodiment, a deep copy means a real physical copy as opposed to a virtual copy. In yet even another embodiment, a virtual copy is an empty delta disk and a reference to the original disk image.

In one embodiment, a common set of modifications 206 is a patch, upgrade or other modification to the base disk image 202. In another embodiment, a modified disk image 210 is a virtual disk image generated by applying the set of modifications 206 to the copy of the base disk image 202'. In still another embodiment, the modified disk image 210 functions as an input to the merge process. Although various operations described in this disclosure may apply directly to the modified disk image 210, these operations may also be applied, or modified to apply on the patch 206 (or common set of modifications) and any version of the base disk image 202 giving rise to the modified disk image 208.

In one embodiment, a delta disk 204 stores identifications of one or more differences between one of a plurality of disk images and the base disk image 202. In another embodiment, each of the one or more differences is maintained or processed at the block level. In still another embodiment, a delta disk 204 is one of a plurality of delta disks, each of which contains at least one delta block. In yet even another embodiment, each delta block identifies a modification to the base disk image 202 requested by a user or an application; for example, a delta disk 204 may store at least one delta block identifying a customization requested by a user. In one embodiment, the contents of the delta disk are processed at the block level. In another embodiment, the contents of the delta disk are processed at a file level abstraction, for example, even if the contents are stored at the block level.

In another embodiment, each of the one or more differences is maintained or processed at the file level. In still even another embodiment, a delta disk 204 is one of a plurality of delta disks, each of which contains at least one delta file. In still another embodiment, each delta file identifies a modification to the base disk image 202 requested by a user or an application; for example, a delta disk 204 may store at least one delta file identifying a customization requested by a user. In yet another embodiment, the contents of the delta disk is processed at the file level. In another embodiment, the contents of the delta disk are processed at a block level abstraction, for example, even if the contents are stored at the file level. In still even another embodiment, each delta file contains at least one delta block. In yet another embodiment, the delta disk 204 is empty, indicating that there are no differences between the one of the plurality of disk images and the base disk image 202.

In some embodiments, a delta file identifies a modification requested by a user to a base disk image 202. In one of these embodiments, a delta file represents a modification to an application or operating system to which an instantiation of the base disk image 202 provides access. In another of these embodiments, a delta file represents a modification to a virtual machine instantiated using the base disk image 202. In other embodiments, the delta file is stored in a delta disk 204. In still other embodiments, the delta file is a delta disk 204.

In one embodiment, a delta disk 204 is equivalent to a delta, delta file, or delta disk image. In some embodiments, a delta disk 204 and a delta file are not equivalent. For example, in one of these embodiments, a delta disk 204 includes at least one of a plurality of delta files, each representing at least one difference between a user disk image and the base disk image. In other embodiments, the methods and systems described herein can apply to either a delta disk 204 or a delta file within a delta disk 204. In still other embodiments, a delta disk 204 stores at least one delta file, each delta file representing at least one difference between a user disk image and the base disk image 202. In further embodiments, a delta disk 204 stores a plurality of delta files, each of which represents at least one difference between a user disk image and a base disk image 202. Although this disclosure generally refers to the use of a delta file as a unit associated with various operations described herein, other unit types, such as a delta block or a delta disk, may be used in place of a delta file.

In one embodiment, the initial virtual disk image 208 represents a virtual disk image formed by applying at least one delta file stored in one of a plurality of delta disks 204 to an instantiation of the base disk image 202. In another embodiment, the initial virtual disk image 208 represents a projection of at least one delta file over an instantiation of the base disk image 202. In still another embodiment, a user creates this virtual disk image during normal use of a computing environment provided by the base disk image 202. In yet another embodiment, the delta disk 204 is initially empty and as the user makes changes, the changes are saved in the delta disk 204, for example, using a copy-on-write process. In some embodiments, the initial virtual disk image 208 is an input to the merge process. Although various operations described in this disclosure apply directly to the initial virtual disk image 208, these operations may also be applied, or modified to apply on the at least one delta file and any version of the base disk image 202 from which the initial virtual disk image 208 may be created.

In one embodiment, the final disk image 214 represents a virtual disk image formed by applying at least one file from the second delta image 212 to the modified disk image 210. In another embodiment, the final disk image 214 represents an image which would have resulted from applying the patch 206 to the base disk image 202, which already has the one of a plurality of delta files (for example, from the delta disk 204) applied to it. In still another embodiment, the final disk image 214 is substantially similar to an image resulting from applying the patch 206 to the base disk image 202 that already has the one of a plurality of delta files applied to it. In yet another embodiment, the final disk image 214 is substantially similar to an image resulting from applying the one of a plurality of delta files to the base disk image 202 that already has the patch 206 applied to it.

Figure 3A:
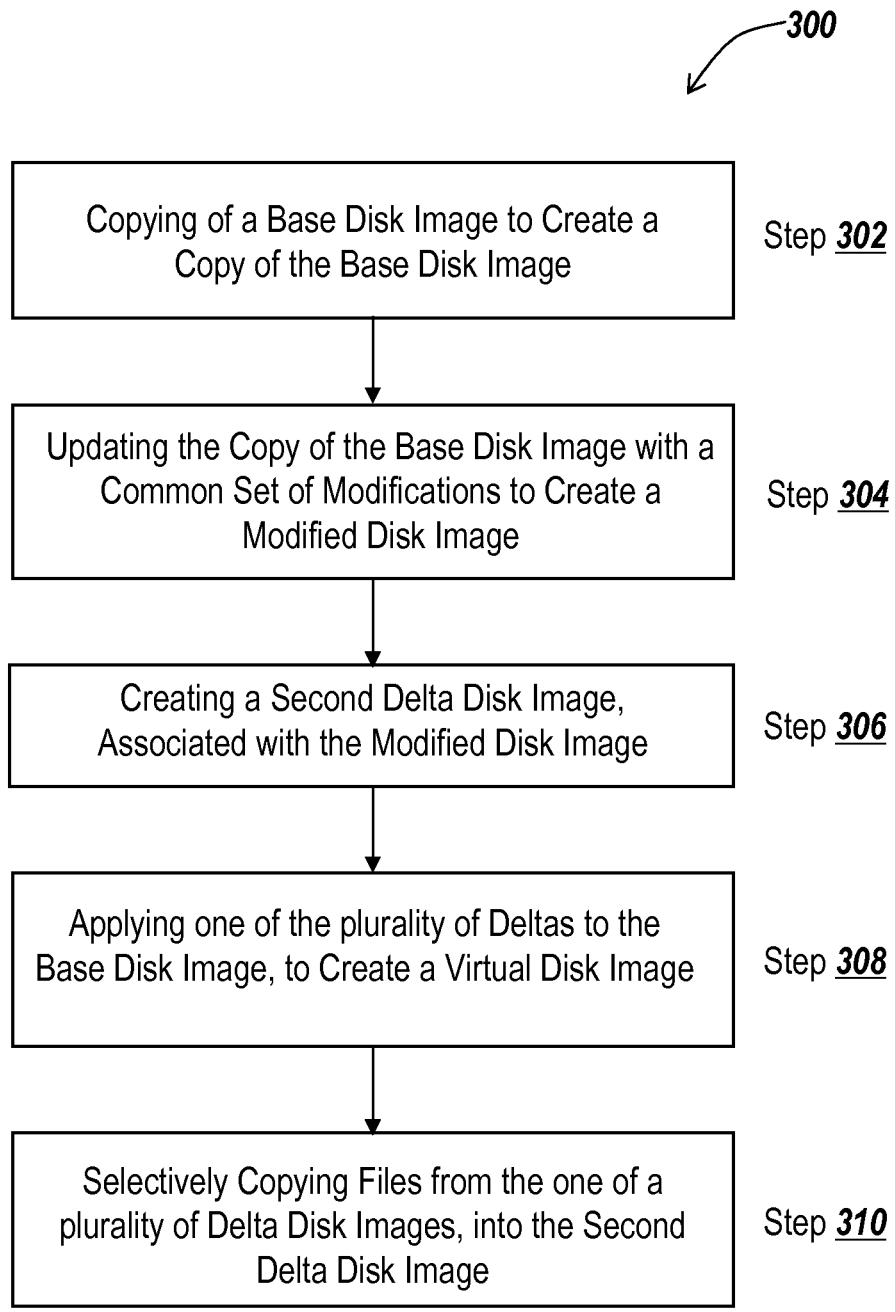
FIG. 3A is a flow diagram depicting one embodiment of a method for updating a plurality of disk images derived from a common base disk image and a plurality of delta files.

Referring now to FIG. 3A, a flow diagram depicts one embodiment of a method 300 for updating a plurality of disk images derived from a common base disk image. In brief overview, the method includes copying the base disk image 202 to create a copy of the base disk image 202 (302). The method includes updating the copy of the base disk image 202 with a patch 206 to create a patched image (304). The method includes creating a second delta disk image 212 associated with the modified disk image (306). The method includes applying a delta file from one of a plurality of delta disks to the base disk image 202 to create an initial virtual disk image 208 (308). The method includes selectively copying delta files from the one of a plurality of delta disks 204, into the second delta disk image 212 (310). In some embodiments, a patch 206 refers to a common set of modifications to be applied to the base disk image 202.

In some embodiments, the method includes instantiating a virtual machine provided by the service image 220 with a set of tools installed in an operating system provided by the virtual machine. In one of these embodiments, the method includes initializing a computing environment provided by the service image 220. In another of these embodiments, the method includes initializing one or more tools included in the service image 220 for implementing a merge process. In another embodiment, the method includes initializing one or more tools for implementing a copy-on-write feature. In yet another of these embodiments, the tools within the virtual machine are used to create disk images 208, 210, and 214.

Referring now to FIG. 3A, and in greater detail, the method includes copying the base disk image to create a copy of the base disk image (302). In one embodiment, a deep copy is performed to create the copy 202' of the base disk image 202. In another embodiment, the service image 220 creates the copy 202' of the base disk image 202. In still another embodiment, the operation of copying the base disk image includes creation of the second delta disk image 212. In yet another embodiment, the second delta disk image 212 is initially empty when created. In still even another embodiment, a virtual copy of the base image is created, comprising at least one delta disk image and a reference to the base disk image 202.

The method includes updating the copy of the base disk image 202 with a patch 206 to create a modified disk image (304). In one embodiment, a patch 206 is applied to the copy 202' of the base disk image 202 as described below in connection with 354 of FIG. 3B. In another embodiment, a patch 206 is a common set of modifications 206. In still another embodiment, updating the copy 202' results in creation of a patched virtual machine image 210. In one embodiment, creation of the modified disk image 210 results in a disk image that is a patched copy of the base disk image. In another embodiment, a file from the set of modifications 206 is applied to the copy 202' of the base disk image 202 to create the modified disk image 210. In yet another embodiment, creation of the modified disk image 210 does not require knowledge of the file system or block layout within image and delta files, nor of the delta file or image file format.

In one embodiment, a final disk image 214 is created, including the modified disk image 210. In another embodiment, a final disk image 214 is created, including the modified disk image 210 and a second delta disk 212. In still another embodiment, the final disk image 214 is created as a projection of the second delta disk 212 over the modified disk image 210. In some embodiments, the modified disk image 210 represents a new common base image for a plurality of users.

A second delta disk image 212 associated with the modified disk image is created (306). In one embodiment, an empty second delta disk image 212 is created. In another embodiment, the delta disk image 212 is created in conjunction with the modified disk image 210. In still another embodiment, the delta disk image 212 is created when the final disk image 214 is created. In yet another embodiment, the second delta disk 212 is created independently from the modified disk image 210. In still even another embodiment, the second delta disk 212 is associated with the modified disk image 210 after both the second delta disk 212 and the modified disk image 210 are created. In some embodiments, the second delta disk 212 represents the new delta disk for the user associated with the original delta disk 204.

One of a plurality of delta disks 204 is applied to the base disk image 202, to create an initial virtual disk image 208 (308). In one embodiment, the method includes applying a delta file within the delta disk 204 to the base disk image 202 to generate an initial virtual disk image 208 comprising a portion of the base disk image 202 modified by the delta image and an unmodified portion of the base disk image 202, as described in greater detail in connection with 352 of FIG. 3B. In another embodiment, a boot-up process is used to affect the changes from the one of the plurality of delta disks, resulting in creation of the initial virtual disk image 208.

In one embodiment, the method includes mounting the modified disk image 210 and the initial virtual disk image 208 within the virtual machine service image. In another embodiment, the method includes mounting the base disk image 202 in addition to the modified disk image 210 and initial virtual disk image 208. In still another embodiment, the base, modified and initial virtual disk images are mounted in preparation for a classical "three-way merge". In some embodiments, a "three-way merge" involves merger of an original image together with two sets of changes. In yet another embodiment, a two-way merge could be used, without mounting the base disk image 202 as a reference. However, in some embodiments, two-way merge is less powerful than three-way merge and may not detect the difference between a file deleted in one image, and a file created in another image.

The method includes selectively copying delta files from the one of a plurality of delta images 204 into the second delta image 212 (310). In one embodiment, a delta file is copied from the initial virtual disk 208 or from the delta disk 204 to a second delta disk 212 associated with the patched copy 210 of the base disk image 202. In another embodiment, files or blocks are written into the final disk image 214 from at least one of: the initial virtual disk image 208, the modified disk image 210, the base disk image 202; for example, a selective merge process may be used to write to the final disk image 214. In still another embodiment, a "copy on write" process tracks the files or blocks written into the final disk image 214. In yet another embodiment, the "copy on write" process tracks differences between the modified disk image 210 and the files or blocks written into the final disk image 214. In yet another embodiment, the "copy on write" process copies these differences into the second delta disk 212. In some embodiment, some of these differences are represented by delta files from the delta disk 204.

In one embodiment, a "copy on write" process is used to selectively copy delta files from the delta disk 204 into the second delta image 212. In another embodiment, selective copying of delta files avoids copying any delta files that affect a portion of the base disk image corresponding to the patched portion of the base disk image. In still another embodiment, the method includes determining not to copy one or more delta files that affect a portion of the base disk image corresponding to the patched portion of the base disk image. In yet another embodiment, a rule may be applied to determine whether and how to copy delta files that do correspond to a patched portion of the base disk image.

In one embodiment, a delta file is copied to the second delta disk image 212 for application to the patched copy 210 of the base disk image 202. In another embodiment, a delta file from the second delta disk image 212 is applied to the patched copy of the base disk image. In yet another embodiment, delta files from the second delta disk image 212 can be applied to the patched copy of the base disk image sequentially (i.e., one delta file at a time), or simultaneously (e.g., as a collection of files or a single merged file).

In some embodiments, the method includes examining the initial virtual disk image 208 to find the files that are in the one of a plurality of delta images 204, and not in the base disk image 202. In one of these embodiments, the method includes determining that a delta file in a delta disk 204 does not affect a portion of the base disk image 202 corresponding to a patched portion of the base disk image 202. In another of these embodiments, examining the initial virtual disk image 208 includes determining that the patch is applied to a portion of the base disk image 202 corresponding to the unmodified portion of the base disk image 202, as described below in connection with 356 of FIG. 3B. In still another of these embodiments, the method includes determining, via a merge process, that the patch is applied to a portion of the base disk image 202 corresponding to the unmodified portion of the base disk image 202. For example, the merge process may be a three-way merge process. In yet another of these embodiments, the method includes applying a delta file in the delta disk 204 to the patched copy of the base disk image 202 as described below in connection with 358 of FIG. 3B. In this embodiment, the patch 206 does not conflict with the delta file.

Figure 3B:
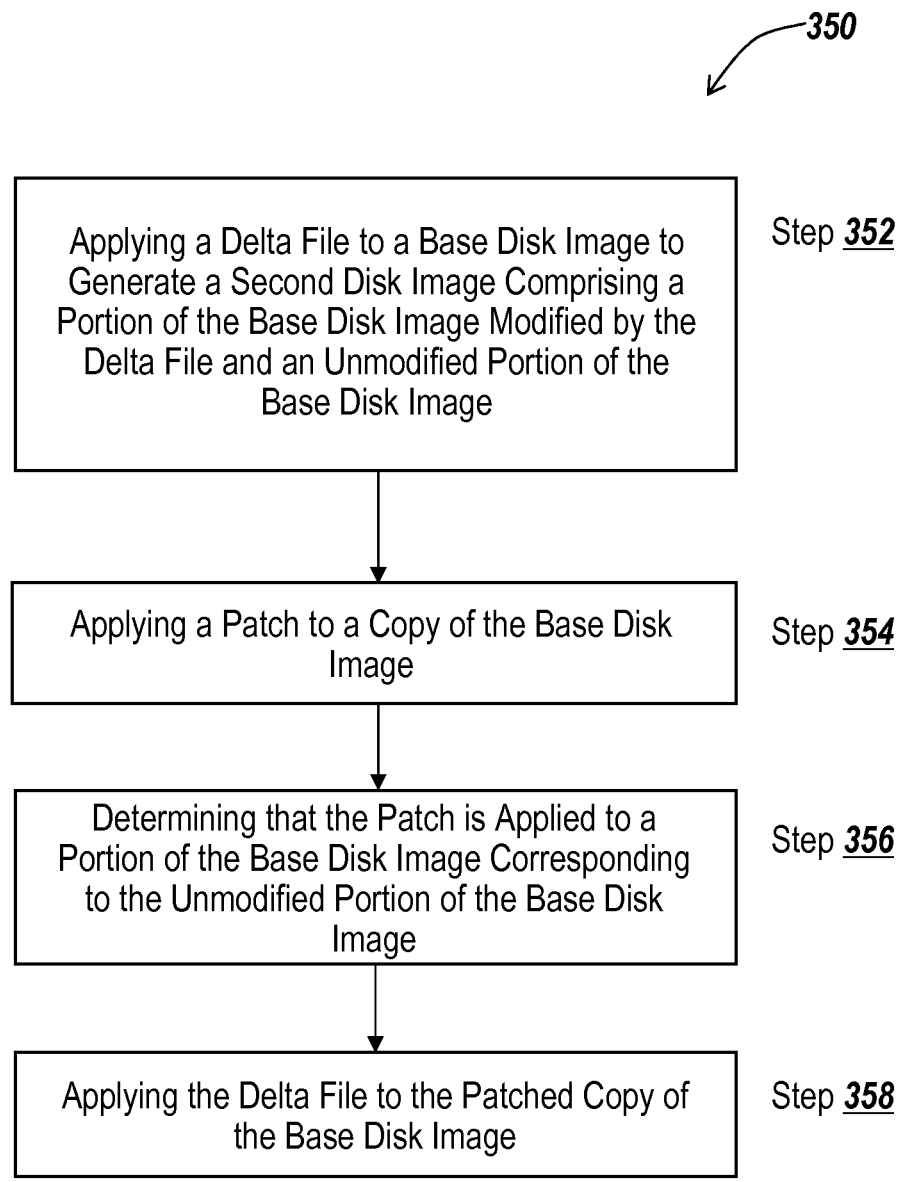
FIG. 3B is a flow diagram depicting an embodiment of a method for updating a plurality of disk images derived from a common base disk image and a plurality of delta files.

Referring now to FIG. 3B, a flow diagram depicts one embodiment of a method 350 for updating a plurality of disk images derived from a common base disk image. The method includes applying a delta file to a base disk image to generate an initial virtual disk image comprising a portion of the base disk image modified by the delta file and an unmodified portion of the base disk image (352). The method includes applying a patch to a copy of the base disk image (354). The method includes determining that the patch is applied to a portion of the base disk image corresponding to the unmodified portion of the base disk image (356). The method includes applying the delta file to the patched copy of the base disk image (358).

A delta file is applied to a base disk image to generate a virtual disk image comprising a portion of the base disk image modified by the delta file and an unmodified portion of the base disk image (352). In one embodiment, a delta file from the delta disk 204 is applied to the base disk image 202 to generate an initial virtual disk image 208. In another embodiment, the initial virtual disk image 208 includes i) a portion of the base disk image 202 modified by the delta file and ii) a portion of the base disk image 202 unmodified by the delta file.

A patch is applied to a copy of the base disk image (354). In one embodiment, a patch 206 is applied to the copy 202' of the base disk image 202. In another embodiment, a patch update includes mounting the base disk image 202 as a disk in the computing environment provided by the service image 220, and applying the patch 206 from within an operating system made available by the base disk image 202. In still another embodiment, a boot-up process is used to affect the updates resulting in the patched image.

The method includes determining that the patch is applied to a portion of the base disk image corresponding to the unmodified portion of the base disk image (356). In one embodiment, the method includes determining whether a file from the delta disk 204 identifies a modification that would affect a portion of the base disk image 202 corresponding to a patched portion of the base disk image. In another embodiment, the method includes determining whether the patch 206 is applied to a portion of the base disk image corresponding to the unmodified portion of the base disk image or to a portion modified by a delta file. In another of these embodiments, the method includes applying at least one delta file from the delta disk 204 to the patched copy of the base disk image 202. In this embodiment, the delta disk 204 is allowed to modify the patched base disk image 202, because the determination indicated that there would be no conflicts between modifications identified by the patch and those identified by the delta file. In still another of these embodiments, the method includes copying at least one delta file of the delta disk 204, into a second delta disk 212, responsive to the determination.

In one embodiment, the method includes determining not to apply at least one delta file from the delta disk 204 to the patched copy of the base disk image 202, responsive to the determination that the patch 206 is applied to a portion of the base disk image corresponding to the modified portion of the base disk image 202. In this embodiment, applying the patch 206 takes precedence over applying the modification identified by the at least one delta file. In another embodiment, delta files of the delta disk 204 are not copied into a second delta disk image 212, responsive to the determination and to avoid potential conflicts between the patch and the at least one delta file.

In one embodiment, the tools in the service image 220 may perform any of these determinations. In another embodiment, a determination as to whether a patch would affect a portion of the base disk image 208 modified by a file in the delta disk 204 is made by comparing the modified disk image 210 against the base disk image 202 and the initial virtual disk image 208. In still another embodiment, the determination is made based on file modification records that may include file modify times.

In one embodiment, the determination is made without the need to mount the base disk image 202. In another embodiment, the determination is made by performing a deep compare of file contents or attributes. In yet another embodiment, the determination is made by comparing the delta disk 204 or delta file against the initial virtual disk image 208.

In one embodiment, a portion of the disk may be quantified into blocks and the related operations applied at the block level. In another embodiment, a portion of the disk may be quantified into files at the file level, and the related operations applied at the file level. In still another embodiment, some of the steps described in the disclosure may operate at the file level while other steps may operate at the block level. In yet another embodiment, some of the steps described in the disclosure may operate at either the file level or the block level.

In one embodiment, and with respect to registry files, determinations regarding whether to apply a delta file to the patched copy 210 of the disk image 202 are made by evaluating the patched disk image 210 at the key level rather than at the file level. In another embodiment, a determination is made that the patch 206 was applied to a registry key within a portion of the base disk image 202 corresponding to the modified portion of the base disk image. In still another embodiment, a determination is made regarding whether to apply the modification identified by the delta file, at a registry key level, to a portion of the patched copy of the base disk image corresponding to the modified portion of the base disk image. In another embodiment, registry files are processed as mini file systems containing a large number of entries, each of which is analogous to a file. For example, in merging two copies, both of which had modified different entries, a merged copy can be created containing both of these changes. The two copies may include a copy of the registry file with the patch 206 applied, and a copy of the registry file with the delta disk 204 applied; if the same entry is changed in both copies, then timestamps or heuristics may be used in determining which to keep or how to merge the files. In still another embodiment, a merge process, such as a three-way merge process, of registry keys can be performed. For example, the three-way merge may have as inputs an original registry file, a copy of the registry file with the patch 206 applied, and a copy of the registry file with a delta file from the delta disk 204 applied. In another embodiment, responsive to the determination, the delta file is not copied to the second delta disk image 212 associated with the patched copy of the base disk image.

In one embodiment, a determination is made that the patch was applied to a registry key within the base disk image 202 corresponding to a portion of the base disk image unmodified by a delta file. In another embodiment, a modification identified by the delta file is applied, at a key level, to the patched copy of the base disk image because there is no conflict between the modification identified by the delta file (to a modified portion of the base disk image) and the portion of the base disk image modified by the patch (to the unmodified portion of the base disk image). In this embodiment, the delta file does not conflict with the patch 206. In another embodiment, responsive to the determination, the delta file is copied to the second delta disk image 212 associated with the patched copy of the base disk image.

In one embodiment, the method includes determining that the patch is applied to a registry portion of the base disk image corresponding to the modified portion of the base disk image, and applying the delta file, at a key level, to the patched copy of the base disk image. In this embodiment, the delta file is allowed to modify the patched copy of the base disk image in spite of a potential conflict between a modification by the patch and a modification by the delta file. In another embodiment, responsive to the determination, the delta file is copied to the second delta disk image 212 associated with the patched copy of the base disk image.

In one embodiment, the method includes the steps of determining that the patch is applied to a registry portion of the base disk image corresponding to the modified portion of the base disk image, and determining not to apply the delta file to the patched copy of the base disk image. In this embodiment, the patch 206 takes precedence over the delta file. In another embodiment, responsive to the determination, the delta file is not copied to the second delta disk image 212 associated with the patched copy of the base disk image.

In some embodiments, the methods discussed above can be applied to database or log-files. Database files contain many entries and can, in some embodiments, be merged in the way as described above in connection with registry files. Log-files contain lists of entries each with a timestamp and sorted in time order. Two such files can be merged by aggregating and resorting the entries. For example, and in one embodiment, the method includes determining that the patch is applied to a database or a log-file portion of the base disk image corresponding to the modified portion of the base disk image, and merging the delta file, using timestamps and/or heuristics, to a portion of the patched copy of the base disk image corresponding to the modified portion of the base disk image. In another embodiment, a three-way merge of database or log files can be performed. In still another embodiment, the delta file is not copied to the second delta disk image 212 associated with the patched copy of the base disk image.

In one embodiment, the method includes determining that the patch is applied to a database or a log-file portion of the base disk image corresponding to the unmodified portion of the base disk image and applying the delta file to the patched copy of the base disk image. In this embodiment, the delta file does not conflict with the patch 206. In another embodiment, responsive to the determination, the delta file is copied to the second delta disk image 212 associated with the patched copy of the base disk image.

In one embodiment, the method includes determining that the patch is applied to a database or a log-file portion of the base disk image corresponding to the modified portion of the base disk image, and applying the delta file to the patched copy of the base disk image. In this embodiment, the delta file is allowed to modify the patched copy of the base disk image. In another embodiment, responsive to the determination, the delta file is copied to the second delta disk image 212 associated with the patched copy of the base disk image.

In one embodiment, the method includes determining that the patch is applied to a database or a log-file portion of the base disk image corresponding to the modified portion of the base disk image, and determining not to apply the delta file to the patched copy of the base disk image. In this embodiment, the patch 206 takes precedence over the delta file. In another embodiment, responsive to the determination, the delta file is not copied to the second delta disk image 212 associated with the patched copy of the base disk image.

In some of these embodiments, a rule engine is used to resolve a file level conflict. File level conflicts may occur when a file is changed in the base disk image 202 resulting from both the patch 206 and the delta disk image 204. In one embodiment, the rules indicate whether changes from the patch 206 or the delta disk image 204 should get preference, or whether a special merge operation is required. For example, the rules can be in the form of a wildcard list of files that should take precedence over other modifications:

```
C:/Windows/System32/<any>   : D "wins"
<any>/NTUser.Dat            : merge using Registry_merge technique
```

In one embodiment, the rule engine determines whether to copy a delta file to the second delta image 212. In another embodiment, the rule engine operates with, or is used in conjunction with a three-way merge process. In still another embodiment, an administrator may specify the rules. In yet another embodiment, a machine may generate the rules based on any algorithm, guideline, formula, or any historical and/or statistical data.

In some embodiments, the following listing includes examples of rules or commands used in association with file level conflicts. In one embodiment, a file level conflict may occur when a change to a file in the modified disk image 210 is different from a change applied to the corresponding file in the initial virtual disk image 208. In another embodiment, one or more of these rules or commands are associated with a rule engine. In some embodiments, the following listing includes examples of rules or commands used in association with one or more of: registry keys, log files and database files.

In some embodiments, rules are applied responsive to a file level conflict. In other embodiments, the rules engine includes commands for initiating the rules in the rule engine. In other embodiments, the rules engine includes commands for adding rules into the rule engine. In one of these embodiments, one or more rules are generated in response to executing each of these commands. In another of these embodiments, the rules engine includes one or more rules which can be applied responsive to a file level conflict. For example, in still another of these embodiments, if the base disk image 202 had a file X and this file was deleted in both the first and second images, then this may not be considered a file level conflict. However if X was modified in the initial virtual disk image 208 and deleted in the modified disk image 210 then this may be considered a file level conflict.

In some embodiments, a command or rule may have a plurality of arguments. In one of these embodiments, the first argument of the command identifies one or more files or registry keys affected by the rule. The first argument may identify one or more registry keys, log files, database files, other types of files, or a collection of different types of files. In another of these embodiments, the first argument of the command includes one or more of: a directory path description, a file name, and pattern-matching strings for directory, file or path names. In some of these embodiments, the second argument describes the action of the rule. In still another of these embodiments, the second argument describes an action on the identified one or more files. In yet another of these embodiments, the third argument contains a description or comment, for example, from the administrator. In still another embodiment, the third argument is optional.

In some embodiments, the second argument may be at least one of: HandleBy.copy, HandleBy.ignore, HandleBy.registryMerge. In one of these embodiments, the action "HandleBy.copy" directs the system to copy the corresponding delta file from the delta disk 204 to the second delta disk 212. In another of these embodiments, the action "HandleBy.copy" directs the system to copy the corresponding delta file from the initial virtual disk image 208 to the second delta disk 212. In this embodiment, the rule may determine that a change from the delta file takes precedence over a change from the patch 206. In still another of these embodiments, the action "HandleBy.ignore" directs the system to not copy the corresponding delta file or delta change into the second delta disk 212. In this embodiment, the rule may determine that a change from the patch 206 takes precedence over a change identified by the delta file. In still even another of these embodiments, the action HandleBy.registryMerge directs the system to perform a merging process for registry files identified by the rule. In yet another of these embodiments, a particular action applies only to one type of file. For example, in one of these embodiments, HandleBy.registryMerge may apply only to a registry key.

As an example, and in one embodiment, the following command:
rules.Add(@"\windows\security\*", HandleBy.ignore, "security");
when executed, adds a rule to the rule engine. In this example, the rule applies to files matching the search patch specified by "\windows\security\*", including any child directories. In another embodiment, the action directs the system to ignore the changes by the delta file and therefore not copy the delta file into the second delta disk 212. In still another embodiment, the administrator adds a comment ("security") to the rule indicating that this rule applies to security files.

In one embodiment, HandleBy.copy and HandleBy.ignore belong to a plurality of primary rules. In another embodiment, HandleBy.registryMerge is one of a plurality of secondary rules. In still another embodiment, HandleBy.copy, HandleBy.ignore, HandleBy.registryMerge may be primary or secondary rules. In one embodiment, one or more of these rules may be determine, through experimentation, analysis, or otherwise, to handle the specified files or registry keys in a preferred way or to meet certain performance standards, quality of service, or standards for user experience. It is to be understood that the following listing of sample rules is for illustration purposes and not by way of limitation:

```
rules.Add(@"\pagefile.sys", HandleBy.ignore);
rules.Add(@"\windows\schedlgu.txt", HandleBy.copy);
rules.Add(@"\windows\oewablog.txt", HandleBy.ignore);
rules.Add(@"\windows\debug\oakley.log", HandleBy.copy, "from experiments");
rules.Add(@"\windows\debug\oakley.log.sav", HandleBy.copy, "from experiments");
rules.Add(@"\windows\debug\usermode\userenv.log", HandleBy.copy);
rules.Add(@"\windows\prefetch\layout.ini", HandleBy.ignore);
rules.Add(@"\windows\prefetch\*.pf", HandleBy.ignore);
rules.Add(@"\windows\softwaredistribution\datastore\datastore.edb", HandleBy.copy);
rules.Add(@"\windows\softwaredistribution\datastore\logs\*", HandleBy.copy);
rules.Add(@"\windows\windowsupdate.log", HandleBy.ignore);
rules.Add(@"\system volume information\_restore*", HandleBy.ignore, "guess");
rules.Add(@"\system volume information\*", HandleBy.ignore, "guess");
rules.Add(@"\windows\security\edb.chk", HandleBy.copy, "from experiments");
rules.Add(@"\windows\security\edb.log", HandleBy.copy, "from experiments");
rules.Add(@"\windows\system32\catroot2\*", HandleBy.copy, "guess");
rules.Add(@"\windows\security\*", HandleBy.ignore, "security TODO");
rules.Add(@"\windows\system32\perfc009.dat", HandleBy.ignore);
rules.Add(@"\windows\system32\perfh009.dat", HandleBy.ignore);
rules.Add(@"\windows\system32\perfstringbackup.ini", HandleBy.ignore, "perf counter backup");
rules.Add(@"\windows\system32\fntcache.dat", HandleBy.ignore, "font cache");
rules.Add(@"\windows\system32\wpa.dbl", HandleBy.copy, "windows activation");
rules.Add(@"\windows\system32\config\*.evt", HandleBy.ignore);
rules.Add(@"\windows\system32\config\default", HandleBy.registryMerge);
rules.Add(@"\windows\system32\config\sam", HandleBy.registryMerge);
rules.Add(@"\windows\system32\config\security", HandleBy.registryMerge);
rules.Add(@"\windows\system32\config\software", HandleBy.registryMerge);
rules.Add(@"\windows\system32\config\system", HandleBy.registryMerge);
rules.Add(@"\windows\system32\config\default.log", HandleBy.ignore);
rules.Add(@"\windows\system32\config\sam.log", HandleBy.ignore);
rules.Add(@"\windows\system32\config\security.log", HandleBy.ignore);
rules.Add(@"\windows\system32\config\software.log", HandleBy.ignore);
rules.Add(@"\windows\system32\config\system.log", HandleBy.ignore);
rules.Add(@"\windows\system32\config\newsid backup\*", HandleBy.copy);
rules.Add(@"\windows\system32\config\systemprofile\ntuser.dat", HandleBy.registryMerge);
rules.Add(@"\windows\system32\config\systemprofile\ntuser.dat.log",
    HandleBy.registryMerge);
rules.Add(@"\windows\system32\config\systemprofile\local settings\temporary internet files\content.ie5\index.dat",
    HandleBy.ignore);
rules.Add(@"\windows\system32\config\systemprofile\local settings\history\history.ie5\index.dat",
    HandleBy.ignore);
rules.Add(@"\windows\system32\wbem\logs\*.log", HandleBy.ignore);
rules.Add(@"\windows\system32\wbem\repository\fs", HandleBy.wmiMerge);
rules.Add(@"\documents and settings\" + BaseAdminAccount, HandleBy.ignore);
rules.Add(@"\documents and settings\*\ntuser.dat", HandleBy.registryMerge);
rules.Add(@"\documents and settings\*\ntuser.dat.log", HandleBy.ignore);
rules.Add(@"\documents and settings\*\local settings\application data\microsoft\windows\usrclass.dat",
    HandleBy.registryMerge);
rules.Add(@"\documents and settings\*\local settings\application data\microsoft\windows\usrclass.dat.log",
    HandleBy.ignore);
rules.Add(@"\documents and settings\*\start menu\programs\accessories\entertainment\windows media player.lnk",
    HandleBy.copy);
rules.Add(@"\Microsoft\Windows NT\CurrentVersion\Winlogon\Notify\WgaLogon\Settings\Data",
    HandleBy.copy);
```

-continued

```
rules.Add(@"\Microsoft\WZCSVC\Parameters\Interfaces\ActiveSettings", HandleBy.copy);
rules.Add(@"\Microsoft\Windows NT\CurrentVersion\Prefetcher\StartTime",
        HandleBy.ignore);
rules.Add(@"\Microsoft\Windows NT\CurrentVersion\Prefetcher\TracesProcessed",
        HandleBy.ignore);
rules.Add(@"\Microsoft\Windows NT\CurrentVersion\Prefetcher\TracesSuccessful",
        HandleBy.ignore);
rules.Add(@"\Microsoft\Windows NT\CurrentVersion\Prefetcher\ExitTime", HandleBy.ignore);
rules.Add(@"\Microsoft\DirectDraw\MostRecentApplication\ID", HandleBy.ignore);
rules.Add(@"\Microsoft\Windows NT\CurrentVersion\Prefetcher\ExitTime", HandleBy.ignore);
rules.Add(@"\Microsoft\Windows NT\CurrentVersion\ProfileList\*\ProfileLoadTimeLow",
        HandleBy.ignore);
rules.Add(@"\Microsoft\Windows NT\CurrentVersion\ProfileList\*\ProfileLoadTimeHigh",
        HandleBy.ignore);
rules.Add(@"\Microsoft\Windows NT\CurrentVersion\Winlogon\Notify\WgaLogon\Settings\Data",
        HandleBy.copy);
rules.Add(@"\ControlSet*\Control\Lsa\SspiCache\Time", HandleBy.ignore);
rules.Add(@"\ControlSet*\Control\Print\Providers\LogonTime", HandleBy.ignore);
rules.Add(@"\ControlSet*\Control\Watchdog\Display\ShutdownCount", HandleBy.ignore);
rules.Add(@"\ControlSet*\Control\Windows\ShutdownTime", HandleBy.ignore);
rules.Add(@"\Microsoft\Rpc\UuidSequenceNumber", HandleBy.copy);
rules.Add(@"\Software\Microsoft\Windows\CurrentVersion\Explorer\Shell Folders\AppData",
        HandleBy.copy);
rules.Add(@"\Software\Microsoft\Windows\CurrentVersion\Explorer\Shell Folders\Cookies",
        HandleBy.copy);
rules.Add(@"\Software\Microsoft\Windows\CurrentVersion\Explorer\Shell Folders\Cache",
        HandleBy.copy);
rules.Add(@"\Classes\ftp\DefaultIcon\", HandleBy.copy, "user installed alt browser");
rules.Add(@"\Classes\ftp\shell\open\command\", HandleBy.copy, "user installed alt browser");
rules.Add(@"\Classes\http\shell\open\command\", HandleBy.copy, "user installed alt browser");
rules.Add(@"\Classes\https\shell\open\command\", HandleBy.copy, "user installed alt
        browser");
rules.Add(@"\Microsoft\Windows\CurrentVersion\Group Policy\State\Machine\Extension-List\*\StartTimeLo",
        HandleBy.ignore);
rules.Add(@"\Microsoft\Windows\CurrentVersion\Group Policy\State\Machine\Extension-List\*\StartTimeHi",
        HandleBy.ignore);
rules.Add(@"\Microsoft\Windows\CurrentVersion\Group Policy\State\Machine\Extension-List\*kEndTimeLo",
        HandleBy.ignore);
rules.Add(@"\Microsoft\Windows\CurrentVersion\Group Policy\State\Machine\Extension-List\*\EndTimeHi",
        HandleBy.ignore);
rules.Add(@"\Microsoft\Windows\CurrentVersion\Group Policy\State\*\Extension-List\*\StartTimeLo",
        HandleBy.copy);
rules.Add(@"\Microsoft\Windows\CurrentVersion\Group Policy\State\*\Extension-List\*\StartTimeHi",
        HandleBy.copy);
rules.Add(@"\Microsoft\Windows\CurrentVersion\Group Policy\State\*\Extension-List\*\EndTimeLo",
        HandleBy.copy);
rules.Add(@"\Microsoft\Windows\CurrentVersion\Group Policy\State\*\Extension-List\*\EndTimeHi",
        HandleBy.copy);
rules.Add(@"\Microsoft\Windows\CurrentVersion\Internet Settings\Cache\Paths\Directory",
        HandleBy.copy);
rules.Add(@"\Microsoft\Windows\CurrentVersion\Internet Settings\Cache\Paths\path1\CachePath",
        HandleBy.copy);
rules.Add(@"\Microsoft\Windows\CurrentVersion\Internet Settings\Cache\Paths\path2\CachePath",
        HandleBy.copy);
rules.Add(@"\Microsoft\Windows\CurrentVersion\Internet Settings\Cache\Paths\path3\CachePath",
        HandleBy.copy);
rules.Add(@"\Microsoft\Windows\CurrentVersion\Internet Settings\Cache\Paths\path4\CachePath",
        HandleBy.copy);
rules.Add(@"\ControlSet*\Services\Tcpip\Parameters\Interfaces\*\LeaseObtainedTime",
        HandleBy.copy);
rules.Add(@"\ControlSet*\Services\Tcpip\Parameters\Interfaces\*\T1", HandleBy.copy);
rules.Add(@"\ControlSet*\Services\Tcpip\Parameters\Interfaces\*\T2", HandleBy.copy);
rules.Add(@"\ControlSet*\Services\Tcpip\Parameters\Interfaces\*\LeaseTerminatesTime",
        HandleBy.copy);
rules.Add(@"\ControlSet*\Services\*\Parameters\Tcpip\LeaseObtainedTime", HandleBy.copy);
rules.Add(@"\ControlSet*\Services\*\Parameters\Tcpip\T1", HandleBy.copy);
rules.Add(@"\ControlSet*\Services\*\Parameters\Tcpip\T2", HandleBy.copy);
rules.Add(@"\ControlSet*\Services\*\Parameters\Tcpip\LeaseTerminatesTime",
        HandleBy.copy);
rules.Add(@"\ControlSet*\Services\*\parameters\Guid", HandleBy.copy);
rules.Add(@"\ControlSet*\Services\SharedAccess\Epoch\Epoch", HandleBy.copy);
rules.Add(@"\Microsoft\Cryptography\RNG\Seed", HandleBy.copy);
rules.Add(@"\Microsoft\Windows NT\CurrentVersion\LastFontSweep\LastSweepTime",
        HandleBy.copy);
rules.Add(@"\Microsoft\SystemCertificates\AuthRoot\Certificates\*\Blob", HandleBy.copy);
rules.Add(@"\Microsoft\SystemCertificates\CA\Certificates\*\Blob", HandleBy.copy);
rules.Add(@"\SAM\Domains\Account\Users\*\F", HandleBy.copy);
rules.Add(@"\Classes\*\shell\open\command\", HandleBy.copy);
rules.Add(@"\Software\Microsoft\Windows\CurrentVersion\Explorer\Shell Folders\AppData",
        HandleBy.ignore);
```

-continued

```
rules.Add(@"\Software\Microsoft\Windows\CurrentVersion\Explorer\Shell Folders\Cookies",
        HandleBy.ignore);
rules.Add(@"\Software\Microsoft\Windows\CurrentVersion\Explorer\Shell Folders\Cache",
        HandleBy.ignore);
rules.Add(@"\Software\Microsoft\Windows\CurrentVersion\Explorer\Shell Folders\History",
        HandleBy.ignore);
rules.Add(@"\Software\Microsoft\Windows\CurrentVersion\Internet Settings\Connections\SavedLegacySettings",
        HandleBy.ignore);
rules.Add(@"\Microsoft\Windows\CurrentVersion\Internet Settings\Zones\*\*",
        HandleBy.ignore);
rules.Add(@"\ControlSet*\Services\*\Performance\*", HandleBy.ignore);
rules.Add(@"\ControlSet*\Services\Eventlog\System\Sources", HandleBy.ignore);
rules.Add(@"\ControlSet*\Services\Tcpip\Performance.WbemAdapFileSignature",
        HandleBy.ignore);
rules.Add(@"\Microsoft\WBEM\CIMOM\LastFullDredgeTimestamp", HandleBy.copy);
rules.Add(@"\Microsoft\WBEM\PROVIDERS\Performance\Performance Data",
        HandleBy.ignore);
rules.Add(@"\ControlSet*\Services\Tcpip\Performance.WbemAdapFileSize",
        HandleBy.ignore);
rules.Add(@"\Software\Microsoft\Windows\CurrentVersion\Explorer\Shell Folders\History",
        HandleBy.copy);
rules.Add(@"\Software\Microsoft\Windows\CurrentVersion\Internet Settings\Connections\SavedLegacySettings",
        HandleBy.copy);
rules.Add(@"\Microsoft\Cryptography\RNG.Seed\", HandleBy.copy);
rules.Add(@"\Microsoft\DirectDraw\MostRecentApplication\ID", HandleBy.copy);
rules.Add(@"\Microsoft\PCHealth\PchSvc\DataCollection", HandleBy.copy);
rules.Add(@"\Microsoft\Windows NT\CurrentVersion\LicenseInfo", HandleBy.copy);
rules.Add(@"\ControlSet*\Control\Session Manager\AppCompatibility\AppCompatCache",
        HandleBy.copy);
rules.Add(@"\ControlSet*\Control\Session Manager\Memory Management\PrefetchParameters\VideoInitTime",
        HandleBy.copy);
rules.Add(@"\ControlSet*\Control\Session Manager\Power\AcPolicy", HandleBy.copy);
rules.Add(@"\ControlSet*\Control\Session Manager\Power\DcPolicy", HandleBy.copy);
rules.Add(@"\ControlSet*\Services\Dhcp\Parameters\*", HandleBy.copy);
rules.Add(@"\ControlSet*\Services\Tcpip\Parameters\Interfaces\*\DhcpIPAddress",
        HandleBy.copy);
rules.Add(@"\ControlSet*\Services\*\Parameters\Tcpip\DhcpIPAddress", HandleBy.copy
```

In some embodiments, a tool (e.g., a tool provided by a service image 220) analyzes the portions of the base disk image, the first disk image 210, and the initial virtual disk image 208 to determine how to resolve conflicts. In one of these embodiments, the tool accesses a mapping of changes to operations to determine how to resolve a conflict. In another of these embodiments, by way of example, and without limitation, the mapping has the following form:

| Portion of Base disk image 202 | Portion of Modified disk image 210 | Portion of Initial virtual disk image 208 | Operation or Rule |
| --- | --- | --- | --- |
| Reference | No change | No change | No copy or merge needed |
| Reference | No change | Change | Copy |
| Reference | Change | No change | No copy or merge needed |
| Reference | Change | Change | Merge |

In some embodiments, the operations are determined by the rules or the rule engine. In other embodiments, one or more of the copy and merge operations are operations as described above in connection with the different file types. In one embodiment, the method includes a first scan to determine the changes corresponding to the base disk image 202. In another embodiment, the method includes a first scan to determine the changes corresponding to the authoritative reference image. In still another embodiment, information regarding these changes are cached or stored for use with subsequent delta images corresponding to other users.

The method includes applying the delta file to the patched copy of the base disk image (358). In one embodiment, the method includes applying, via a three-way merge process, the delta disk 204 to the patched copy of the base disk image. In another embodiment, the method includes copying one or more delta files of the delta disk 204, into a second delta disk image 212, responsive to the determination. In still another embodiment, the second delta disk image 212 is associated with the patched copy 210 of the base disk image.

In one embodiment, the final virtual disk image 214 corresponding to the one of a plurality of delta disks 204 will, as a result of applying the second delta disk image 212 to the modified disk image, incorporate changes from both the patch 206 and the delta disk 204. The result is achieved as if the patch 206 had been directly applied onto the base disk image 202 with the modifications identified by files in the delta disk 204 already applied to it.

In another embodiment, it is not required to boot each image after applying a file from a delta disk 212, as everything may be run within one 'service' image operating system. In still another embodiment, the boot-up process is used on the operating system within the computing environment provided by the service image 220, followed by mounting the disks to the computing environment. Although this can normally be done without having to reboot the operating system, some embodiments of virtual machine systems may implement a reboot for each set of disks. In some embodiments, when this is the case, the service image 220 is initialized, and this can be made faster than a 'normal' boot, by reducing the size and complexity of the service image 220.

In one embodiment, the method includes caching information about files in the base disk image 202 and in the modified disk image 210 during a first scan, which eliminates this step for other subsequent delta disks 204. In still another embodiment, the method includes discarding the original base disk image 202 and all of the plurality of delta images when a set of second delta images have been created.

In one embodiment, the application of the method results in less overall processing and storage overheads compared to typical existing methods of updating a plurality of disk images derived from a common base disk image and a plurality of delta images, with a common set of modifications.

In another embodiment, the method processes disk images which support multiple delta files or 'chained deltas'. The method includes the steps of identifying files common to several delta disks, but not in the base disk image 202, and recreating a more complex arrangement of delta files to put such common files into a shared intermediate image.

In some embodiments, the method includes, for each of the plurality of delta images, applying the set of modifications or patch 206 to the base disk image 202 which already has the delta disk image 204 applied over it, resulting in an authoritative reference image. In some of these embodiments, this is referred to as "conservative rebasing". In one embodiment, the method includes applying a patch to the initial virtual disk image 208. In another embodiment, the method includes applying a patch to a copy of the initial virtual disk image 208 to create an authoritative reference image. In still another embodiment, the method includes determining that the patch is applied to a portion of the copy of the initial virtual disk image 208 corresponding to a portion of the base disk image modified by a delta file and determining that the patch in the patched copy of the base disk image is applied to a portion of the base disk image unmodified by the delta file. In yet another embodiment, the method includes applying the delta file to the patched copy of the base disk image.

In one embodiment, the method includes copying the delta file to the second delta disk image 212, responsive to the determination. In another embodiment, the method includes applying the delta file to the patched copy of the base disk image. In some embodiments, the method includes application of a rule identified in a mapping, such as, for example, a rule identified in a table of the following form:

| Portion of Base disk image 202 | Portion of Modified disk image 210 | Portion of Authoritative reference image | Operation or Rule |
| --- | --- | --- | --- |
| Reference | No change | No change | No copy or merge needed |
| Reference | No change | Change | Copy (Or no copy or merge, if rules specify so) |
| Reference | Change | No change | Copy (Or no copy or merge, if rules specify so) |
| Reference | Change | Identical Change | No copy or merge needed |
| Reference | Change | Different Change | Copy (Or no copy or merge, if rules specify so) |

In some embodiments, the operations are identified by a rule engine, as described above in connection with FIGS. 3A and 3B. In other embodiments, one or more of the copy and merge operations is as described above in connection with FIGS. 3A and 3B. In one embodiment, a first scan determines the changes and this information is cached or stored for use with subsequent delta images corresponding to other users.

In one embodiment, conservative rebasing is applied in association with each of the plurality of delta disk images. In another embodiment, conservative rebasing is selectively applied to some of the plurality of delta disk images. In still another embodiment, conservative rebasing is applied in association with a first delta disk image to determine whether to apply conservative rebasing to a second delta disk image. For example, it may be preferable to use conservative rebasing to generate new delta disk images 212 in association with a particular patch 206 or a change to a particular portion of the base disk image.

In one of these embodiments, conservative rebasing uses the authoritative reference in parallel with the rule engine, when determining how to merge files. In another of these embodiments, conservative rebasing includes discarding the authoritative reference image when it is no longer needed. In still another of these embodiments, conservative rebasing offers an alternative to using a rule engine to determine how to handle conflicts, by providing a definitive reference in handling conflicts. In some embodiments of the rule engine, the set of rules it carries embodies an understanding of how file conflicts should be handled, but this understanding is an approximation, as patches can perform arbitrary changes when actually implemented. In yet another embodiment, conservative rebasing incurs a greater computational cost during patching, but retains the storage cost advantages of the embodiments described above.

In some embodiments, a copy of the base image 202 is created. In one of these embodiments, the copy of the base disk image is associated with one of a plurality of delta disk images, each of the plurality of delta disk images storing at least one user-generated disk image modification. In another of these embodiments, the base disk image is modified with at least one shared modification file (e.g., at least one patch). In still another of these embodiments, a copy of the modified base disk image 210 is created. In yet another of these embodiments, the copy of the modified base disk image 210 is associated with the one of the plurality of delta disk images; for example, by applying a modification identified by a delta disk to the copy of the modified base disk image 210 the delta disk and the copy of the modified base disk image may be associated.

In some embodiments, the method described provides functionality for managing delta disk images at the file level rather than at the block level, making it possible to patch the common base disk image 202 without the need to recreate the delta files. In one embodiment, a rule engine is used to handle file conflicts. In another embodiment, a decision is made as to whether changes from the patch 206 or the delta disk image 204 should get preference.

A method for updating, in a virtual machine environment, a plurality of disk images with a patch 206, each of the plurality of disk images comprising a delta disk image 204 derived from a common base disk image 202, includes applying a patch to a first copy of a disk image 202', in at least one file. The method includes generating a modified disk image 210 including the patched first copy of the disk image. The method includes applying at least one modification from a delta disk image 204 to an initial virtual machine image 208 comprising a second copy of the common base disk image. The method includes determining whether a portion of the patched first copy of the disk image 210 is affected by the delta disk image 204.

The method includes applying a rule to determine whether to apply the delta disk image 204 on the affected portions, or to replace the affected portions with a new file. In some embodiments, the determination depends on a combination of one or more of the file type, file location, file attributes or file properties. In other embodiments, the extent of changes on the file by the modifications from the delta disk image 204 impacts the determination. In still other embodiments, the extent of changes on the file by the common set of modifications impacts the determination.

In one embodiment, the new file represents the original disk image file as modified by the patch 206. In another embodiment, the new file represents the original disk image file modified by a combination of the patch 206 and the delta disk image 204. In still another embodiment, the new file is generated by a rule defined by a user to give an approximation to a file derived from an existing method for updating a delta disk image. One embodiment of an existing method includes directly applying the common set of modifications 206 onto the common base disk image 202 with the delta disk image already applied.

In some embodiments, the second delta disk image 212 contains both original files from the original delta image, and replaced files. In one embodiment, applying the second delta disk image onto the modified disk image 210 results in a disk image, equivalent to a disk image derived from the common base disk image 202 directly modified by both the delta disk image 204 and the common set of modifications 206 in an existing method. In another embodiment, applying the second delta disk image 212 onto the modified disk image 210 results in a disk image which is an approximation of a disk image derived from the common base disk image 202 directly modified by both the delta disk image 204 and the patch 206 in an existing method.

It should be understood that the systems described above may provide multiple ones of any or each of those components and these components may be provided on either a standalone machine or, in some embodiments, on multiple machines in a distributed system. The systems and methods described above may be implemented as a method, apparatus or article of manufacture using programming and/or engineering techniques to produce software, firmware, hardware, or any combination thereof. In addition, the systems and methods described above may be provided as one or more computer-readable programs embodied on or in one or more articles of manufacture. The term "article of manufacture" as used herein is intended to encompass code or logic accessible from and embedded in one or more computer-readable devices, firmware, programmable logic, memory devices (e.g., EEPROMs, ROMs, PROMs, RAMs, SRAMs, etc.), hardware (e.g., integrated circuit chip, Field Programmable Gate Array (FPGA), Application Specific Integrated Circuit (ASIC), etc.), electronic devices, a computer readable non-volatile storage unit (e.g., CD-ROM, floppy disk, hard disk drive, etc.). The article of manufacture may be accessible from a file server providing access to the computer-readable programs via a network transmission line, wireless transmission media, signals propagating through space, radio waves, infrared signals, etc. The article of manufacture may be a flash memory card or a magnetic tape. The article of manufacture includes hardware logic as well as software or programmable code embedded in a computer readable medium that is executed by a processor. In general, the computer-readable programs may be implemented in any programming language, such as LISP, PERL, C, C++, C#, PROLOG, or in any byte code language such as JAVA. The software programs may be stored on or in one or more articles of manufacture as object code.

Having described certain embodiments of methods and systems for updating, in a virtual machine environment, a plurality of disk images, each of the plurality of disk images comprising a delta disk image derived from a common base disk image, with a common set of modifications, it will now become apparent to one of skill in the art that other embodiments incorporating the concepts of the disclosure may be used. Therefore, the disclosure should not be limited to certain embodiments, but rather should be limited only by the spirit and scope of the following claims.

What is claimed is:

1. A method for updating a plurality of user disk images, each of the plurality of user disk images derived from a common base disk image and a delta image comprising a plurality of delta files, each of the delta files representing at least one difference between one of the plurality of user disk images and the base disk image, the method comprising:
   applying a delta file to a base disk image to generate a second disk image comprising a portion of the base disk image modified by the delta file and an unmodified portion of the base disk image;
   applying a patch to a copy of the base disk image;
   in response to determining that the patch is applied to at least one file of the copy of the base disk image corresponding to the unmodified portion of the base disk image, applying the delta file to the patched copy of the base disk image; and
   in response to determining that the patch is applied to a portion of the base disk image corresponding to the portion of the base disk image modified by the delta file, determining not to apply at least one delta file to the modified portion of the base disk image.

2. The method of claim 1 further comprising mounting the base disk image, the second disk image, and the patched copy of the base disk image in a computing environment.

3. The method of claim 1 further comprising mounting the base disk image, the second disk image, and the patched copy of the base disk image in a virtual machine environment.

4. The method of claim 1 further comprising copying the delta file into a second delta disk image associated with the patched copy of the base disk image, responsive to the determination.

5. The method of claim 1, wherein applying the delta file to the base disk image further comprises applying the delta file of a delta disk image to the base disk image to generate the second disk image, the delta disk image comprising at least one of a plurality of delta files representing at least one difference between a user disk image and the base disk image.

6. The method of claim 1, wherein determining further comprises determining, via a merge process, that the patch is applied to a portion of the base disk image corresponding to the unmodified portion of the base disk image.

7. The method of claim 1, wherein applying further comprises applying, via a merge process, the delta file to the patched copy of the base disk image.

8. The method of claim 1 further comprising:
   applying the delta file to at least one file of the patched copy of the base disk image.

9. The method of claim 1 further comprising:
   determining that the patch is applied to a registry portion of the base disk image corresponding to the modified portion of the base disk image; and
   merging the delta file, at a registry key level, to a portion of the patched copy of the base disk image corresponding to the modified portion of the base disk image.

10. The method of claim 1 further comprising:
    determining that the patch is applied to one of: a database and a log-file portion of the base disk image corresponding to the modified portion of the base disk image; and
    merging the delta file, using at least one of: timestamps and heuristics, to a portion of the patched copy of the base disk image corresponding to the modified portion of the base disk image.

11. The method of claim 1 further comprising generating a second delta disk image storing at least one delta file that when applied to the patched copy of the base disk image generates a third disk image.

12. The method of claim 1, wherein applying the delta file to the patched copy of the base disk image further comprises determining, by a rule engine, to apply the delta file to the patched copy of the base disk image.

13. The method of claim 1 further comprising:
applying a patch to a copy of the second disk image;
determining that the patch is applied to a portion of the copy of the second disk image corresponding to a portion of the base disk image modified by a delta file;
determining that the patch in the patched copy of the base disk image is applied to a portion of the base disk image unmodified by the delta file; and
applying the delta file to the patched copy of the base disk image.

14. A computer implemented system implemented in hardware in combination with software to update a plurality of user disk images, each of the plurality of delta disks derived from a common base disk image and a delta image comprising a plurality of delta files, each of the delta files representing at least one difference between one of the plurality of user disk images and the base disk image, comprising:
a base disk image;
a delta disk image comprising a plurality of delta files, wherein:
at least one of the plurality of delta files is applied to the base disk image to generate a second disk image comprising a portion of the base disk image modified by the delta file and an unmodified portion of the base disk image;
a patch configured for application to a copy of the base disk image to generate a patched copy of the base disk image; and
a computing environment configured to:
in response to a determination that the patch is applied to a portion of the base disk image corresponding to the unmodified portion of the base disk image, apply the delta file to the patched copy of the base disk image; and
in response to a determination that the patch is applied to a portion of the base disk image corresponding to the portion of the base disk image modified by the delta file, determine not to apply at least one delta file to the modified portion of the base disk image.

15. The system of claim 14, wherein the computing environment is further configured to merge the base disk image, the second disk image, and the patched copy of the base disk image.

16. The system of claim 14, wherein the computing environment is a virtual machine environment.

17. The system of claim 14, wherein the computing environment is further configured to manipulate files between disk image format and delta file format.

18. The system of claim 14, wherein the computing environment further comprises an operating system and at least one tool for manipulating disk images.

19. The system of claim 14 wherein the delta file is applied to the patched copy of the base disk image.

20. The system of claim 14, wherein the computing environment is configured to apply via a merge process, the delta file to the patched copy of the base disk image.

21. The system of claim 14, wherein the patch is applied to at least one file of the base disk image corresponding to the unmodified portion of the base disk image.

22. The system of claim 14, wherein the delta file is applied to at least one file of the patched copy of the base disk image.

23. The system of claim 14, wherein the computing environment further comprises a tool for reading and writing disk images.

* * * * *